(12) United States Patent
Lu et al.

(10) Patent No.: US 12,475,887 B2
(45) Date of Patent: Nov. 18, 2025

(54) NETWORK-BASED COMMUNICATION SESSION COPILOT

(71) Applicant: Microsoft Technology Licensing, LLC, Redmond, WA (US)

(72) Inventors: Xiao Yan Lu, Bellevue, WA (US); Amir Kantor, Haifa (IL); Ido Priness, Kiryat Ono (IL); Shiraz Jitendra Cupala, Snohomish, WA (US); Kevin Michael Carter, Atlanta, GA (US); Adi Miller, Ramat Hasharon (IL); Kumud Ranjan, Redmond, WA (US); Shyam Gupta, Surrey (CA); Gautam Jain, Surrey (CA); Yasemin Cenberoglu, Montreal (CA); Shai Ifrach, Yavne (IL); Shlomi Maliah, Rosh Hayin (IL); Jaime Teevan, Bellevue, WA (US); Lan Ye, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 18/213,511

(22) Filed: Jun. 23, 2023

(65) Prior Publication Data

US 2024/0290330 A1 Aug. 29, 2024

Related U.S. Application Data

(60) Provisional application No. 63/448,624, filed on Feb. 27, 2023.

(51) Int. Cl.
*G10L 15/22* (2006.01)
*G10L 15/06* (2013.01)

(52) U.S. Cl.
CPC ............ *G10L 15/22* (2013.01); *G10L 15/063* (2013.01); *G10L 2015/221* (2013.01); *G10L 2015/223* (2013.01)

(58) Field of Classification Search
CPC .............. G10L 15/22; G10L 15/063; G10L 2015/221; G10L 2015/223; G10L 15/26; G06Q 10/10; G06F 40/56
See application file for complete search history.

(56) References Cited

U.S. PATENT DOCUMENTS

| 7,886,012 B2 | 2/2011 | Bedi et al. |
| 8,429,146 B2 | 4/2013 | Shen et al. |

(Continued)

FOREIGN PATENT DOCUMENTS

| EP | 1828934 B1 | 9/2019 |
| JP | 2022180282 A | 12/2022 |
| WO | 2020139865 A1 | 7/2020 |

OTHER PUBLICATIONS

Abdollahpour, et al., "Zero-shot Question Answering with Large Language Models in Python", Retrieved from: https://medium.com/nlplanet/zero-shot-question-answering-with-large-language-models-in-python-9964c55c3b38, Aug. 30, 2022, 9 Pages.

(Continued)

*Primary Examiner* — Michael Colucci
(74) *Attorney, Agent, or Firm* — Schwegman Lundberg & Woessner, P.A.

(57) ABSTRACT

A system for providing a personalized assistant within a network-based communication service includes one or more processors and a memory storage device storing instructions thereon. During a network-based communication session, the system receives a query from a computing device of a first communication session participant and processes the query by determining that a second communication session participant has shared content via a content sharing feature of the network-based communication service. In response, the system provides the query and at least a portion of the shared content as input to a model, which dynamically constructs a prompt for use as input with a generative (Continued)

language model. The system then presents the prompt as input to the generative language model, receives a response as output from the generative language model, and causes presentation of the response to be presented to the communication session participant.

20 Claims, 21 Drawing Sheets

(56) References Cited

U.S. PATENT DOCUMENTS

| | | | |
|---|---|---|---|
| 8,560,562 B2 | 10/2013 | Kanefsky et al. | |
| 8,700,653 B2 | 4/2014 | Hansson et al. | |
| 9,646,612 B2 | 5/2017 | Sharifi | |
| 9,756,286 B1 | 9/2017 | Faulkner | |
| 10,540,971 B2 | 1/2020 | Kumar | |
| 10,594,757 B1* | 3/2020 | Shevchenko | H04N 7/148 |
| 10,810,897 B2 | 10/2020 | Dechu et al. | |
| 10,878,033 B2 | 12/2020 | Ahmed et al. | |
| 10,878,805 B2* | 12/2020 | Agarwal | G06F 3/167 |
| 10,911,718 B2 | 2/2021 | Nassar | |
| 11,017,778 B1* | 5/2021 | Thomson | H04M 3/42382 |
| 11,042,538 B2 | 6/2021 | Braundmeier | |
| 11,483,273 B2 | 10/2022 | Mahmoud et al. | |
| 11,537,674 B2 | 12/2022 | Galimovich | |
| 11,729,009 B1* | 8/2023 | Religa | H04L 67/12 709/204 |
| 11,736,423 B2* | 8/2023 | Wang | G06V 10/454 709/206 |
| 11,908,477 B2 | 2/2024 | Embar | |
| 12,165,646 B2 | 12/2024 | Springer | |
| 2007/0288559 A1 | 12/2007 | Parsadayan et al. | |
| 2009/0165000 A1 | 6/2009 | Gyorfi | |
| 2013/0198159 A1* | 8/2013 | Hendry | G06F 16/3322 707/706 |
| 2016/0006981 A1 | 1/2016 | Bauman et al. | |
| 2016/0210602 A1* | 7/2016 | Siddique | G16H 10/60 |
| 2018/0165583 A1* | 6/2018 | Guiver | G06N 5/04 |
| 2018/0308473 A1 | 10/2018 | Scholar | |
| 2019/0132265 A1 | 5/2019 | Nowak-przygodzki et al. | |
| 2019/0341050 A1 | 11/2019 | Diamant et al. | |
| 2020/0005784 A1* | 1/2020 | Vadackupurath Mani | G06V 40/20 |
| 2020/0184956 A1* | 6/2020 | Agarwal | G10L 15/22 |
| 2020/0186482 A1* | 6/2020 | Johnson, III | G06Q 10/107 |
| 2020/0243095 A1* | 7/2020 | Adlersberg | G06F 40/216 |
| 2020/0356237 A1 | 11/2020 | Moran et al. | |
| 2020/0410998 A1* | 12/2020 | Bar-On | G10L 13/00 |
| 2021/0056860 A1 | 2/2021 | Fahrendorff | |
| 2021/0058263 A1 | 2/2021 | Fahrendorff | |
| 2021/0224336 A1 | 7/2021 | Bright | |
| 2021/0249009 A1 | 8/2021 | Manjunath et al. | |
| 2021/0358188 A1 | 11/2021 | Lebaredian et al. | |
| 2021/0365500 A1 | 11/2021 | Gunaselara et al. | |
| 2021/0390144 A1 | 12/2021 | B M S et al. | |
| 2022/0036153 A1 | 2/2022 | O'Malia et al. | |
| 2022/0109585 A1* | 4/2022 | Asthana | G06F 40/289 |
| 2022/0271963 A1 | 8/2022 | Shah et al. | |
| 2022/0310080 A1 | 9/2022 | Qiu et al. | |
| 2022/0414320 A1* | 12/2022 | Dolan | G06F 40/166 |
| 2023/0033104 A1* | 2/2023 | Geddes | H04L 65/403 |
| 2023/0058470 A1 | 2/2023 | Chandrashekar et al. | |
| 2023/0074406 A1 | 3/2023 | Baeuml et al. | |
| 2023/0091949 A1* | 3/2023 | Erasmus | G06F 3/017 715/753 |
| 2023/0135179 A1* | 5/2023 | Mielke | G06N 5/022 704/232 |
| 2023/0135703 A1 | 5/2023 | Weil | |
| 2023/0154453 A1* | 5/2023 | Erdenee | G06N 3/006 704/231 |
| 2023/0177015 A1 | 6/2023 | Madisetti | |
| 2024/0048513 A1 | 2/2024 | Tessler | |
| 2024/0273345 A1* | 8/2024 | Bharadwaj | G06N 3/045 |

OTHER PUBLICATIONS

Arabzadeh, et al., "PREME: Preference-based Meeting Exploration through an Interactive Questionnaire", In Repository of arXiv:2205.02370v1, Apr. 27, 2023, 12 Pages.

Asi, et al., "An End-to-End Dialogue Summarization System for Sales Calls", In Proceedings of NAACL-HLT: Industry Track Papers, Jul. 10, 2022, pp. 45-53.

Briggs, James, "Fixing YouTube Search with OpenAI's Whisper", Retrieved from: https://www.pinecone.io/learn/openai-whisper/, Retrieved Date: Mar. 31, 2023, 25 Pages.

Cavanell, et al., "Use Natural Language & Prompts with AI Models | Azure OpenAI Service", Retrieved from: https://techcommunity.microsoft.com/t5/microsoft-mechanics-blog/use-natural-language-amp-prompts-with-ai-models-azure-openai/ba-p/3696839, Dec. 14, 2022, 14 Pages.

Greyling, Cobus, "Prompt Engineering, Text Generation & Large Language Models", Retrieved from: https://cobusgreyling.medium.com/prompt-engineering-text-generation-large-language-models-3d90c527c6d5, Sep. 5, 2022, 18 Pages.

Kashyap, Prerna, "COLING 2022 Shared Task: LED Finteuning and Recursive Summary Generation for Automatic Summarization of Chapters from Novels", In Proceedings of the 58th Annual Meeting of the Association for Computational Linguistic, Jul. 5, 2020, pp. 19-23.

Kim, Sung, "How to Get Around OpenAI GPT-3 Token Limits", Retrieved from: https://blog.devgenius.io/how-to-get-around-openai-gpt-3-token-limits-b11583691b32, Retrieved Date: Mar. 31, 2023, 25 Pages.

SB, et al., "Automatic Follow-up Question Generation for Asynchronous Interviews", In Proceedings of the Workshop on Intelligent Information Processing and Natural Language Generation, Sep. 2020, 11 Pages.

Notice of Allowance mailed on May 9, 2025, in U.S. Appl. No. 18/213,515, 19 pages.

"4 Ways You Can Use ChatGPT for Your Next Meeting", Tactiq, Retrieved from the Internet URL: https://web.archive.org/web/20230204100721/https://tactiq.io/learn/4-ways-you-can-use-chatgpt-for-your-next-meeting, Feb. 4, 2023, pp. 1-7.

International Search Report and Written Opinion received for PCT Application No. PCT/US2024/016336), Jul. 11, 2024, 13 pages.

International Search Report and Written Opinion received for PCT Application No. PCT/US2024/016338, Jul. 15, 2024, 13 pages.

Notice of Allowance mailed on Aug. 4, 2025, in U.S. Appl. No. 18/213,525, 16 Pages.

International Preliminary Report on Patentability (Chapter I) received for PCT Application No. PCT/US2024/016338, mailed on Sep. 11, 2025, 07 Pages.

* cited by examiner

⌐ 1100

MONDAY STATUS MEETING

CHAT | PEOPLE | RAISE | REACT | VIEW | COPILOT | NOTES | MORE | CAMERA | MIC | SHARE | LEAVE

02:00

⌐ 1120

AGENDA
○ SETUP AND INTRODUCTIONS
  SARAH ANDERSON 5 MIN

MEETING NOTES

GOALS:
DISCUSS WIDGET PRODUCTION
BRAINSTORM SOLUTIONS TO DEVELOPMENT CHALLENGES

KEY TOPICS:
MOTION-BASED WIDGET IMPLEMENTATION
WIDGET TOO LOUD

VARYING OPINIONS:
SANDHYA SUGGESTS EXPANDING SOUND OUTPUT; OTHERS FOCUS ON REDUCING SOUND OUTPUT

PROS AND CONS FOR EACH IDEA

| IDEAS | PROS | CONS |
|---|---|---|
| IDEA 1 | BENEFIT A<br>BENEFIT B<br>BENEFIT C | CON A<br>CON B |

| COPILOT LIVE | 3 PEOPLE COLLABORATING |
|---|---|
| 10:50 a.m. | |

COPILOT LIVE

HI, EVERYONE, GREAT DISCUSSION SO FAR! HERE'S A SUMMARY OF WHAT HAS BEEN DISCUSSED:

GOALS:
- GOAL 1 DISCUSSED WITH DESCRIPTION
- GOAL 2 DISCUSSED WITH DESCRIPTION

KEY TOPICS:
- KEY TOPIC 1 DISCUSSED DURING THE MEETING WITH DESCRIPTION
- KEY TOPIC 2 DISCUSSED DURING THE MEETING WITH DESCRIPTION
- KEY TOPIC 3 DISCUSSED DURING THE MEETING WITH DESCRIPTION

VARYING OPINIONS:
- DESCRIPTION OF OPINION 1
- DESCRIPTION OF OPINION 2
- DESCRIPTION OF OPINION 3

1410

COPILOT LIVE
CHOOSE THE DIRECTION OF THIS COLLABORATION AND COPILOT LIVE CAN GUIDE YOU TOWARDS THE DIRECTION WITH THE FOLLOWING PROMPTS

GENERATE IDEAS AND INSIGHTS

DISCOVER NEW WAYS OF THINKING ABOUT PROBLEMS AND POTENTIAL SOLUTIONS

[ WHAT'S MISSING FROM THE DISCUSSION? ]

[ SUGGEST NEW IDEAS RELATED TO TOPICS DISCUSSED ]

[ WHAT TOPICS NEED MORE CLARIFICATION? ]

ALIGN OPINIONS
UNDERSTAND EACH PARTICIPANT'S PERSPECTIVES AND ENSURE WORKING TOWARDS A COMMON GOAL

[ WHAT ARE UNRESOLVED QUESTIONS? ]

[ SHOULD WE EXPLORE OTHER OPTIONS FOR WIDGET PRODUCTION BEYOND GERMANY? ]

NETWORK-BASED COMMUNICATION SESSION COPILOT

RELATED APPLICATIONS

This application claims priority to U.S. Provisional Patent Application No. 63/448,624, filed on Feb. 27, 2023, and titled "NETWORK-BASED COMMUNICATION SESSION COPILOT," the entire disclosure of which is incorporated herein by reference.

TECHNICAL FIELD

Embodiments relate to the use of generative language models, such as large language models ("LLMs"), to improve network-based communications, sometimes referred to as network-based meetings. Further embodiments pertain to using machine-learned language models to provide a personal assistant to communication session participants.

BACKGROUND

Network-based communication sessions such as network-based meetings allow users to interact with people in remote locations. In addition to providing voice and video capabilities, network-based communication sessions also allow users to share content, applications, screens, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 1-11 illustrate various GUIs of a network-based communication application engaged in a network-based communication session according to some examples of the present disclosure.

FIG. 14 illustrates a GUI of a collaborative copilot according to some examples of the present disclosure.

DETAILED DESCRIPTION

Figure 1:
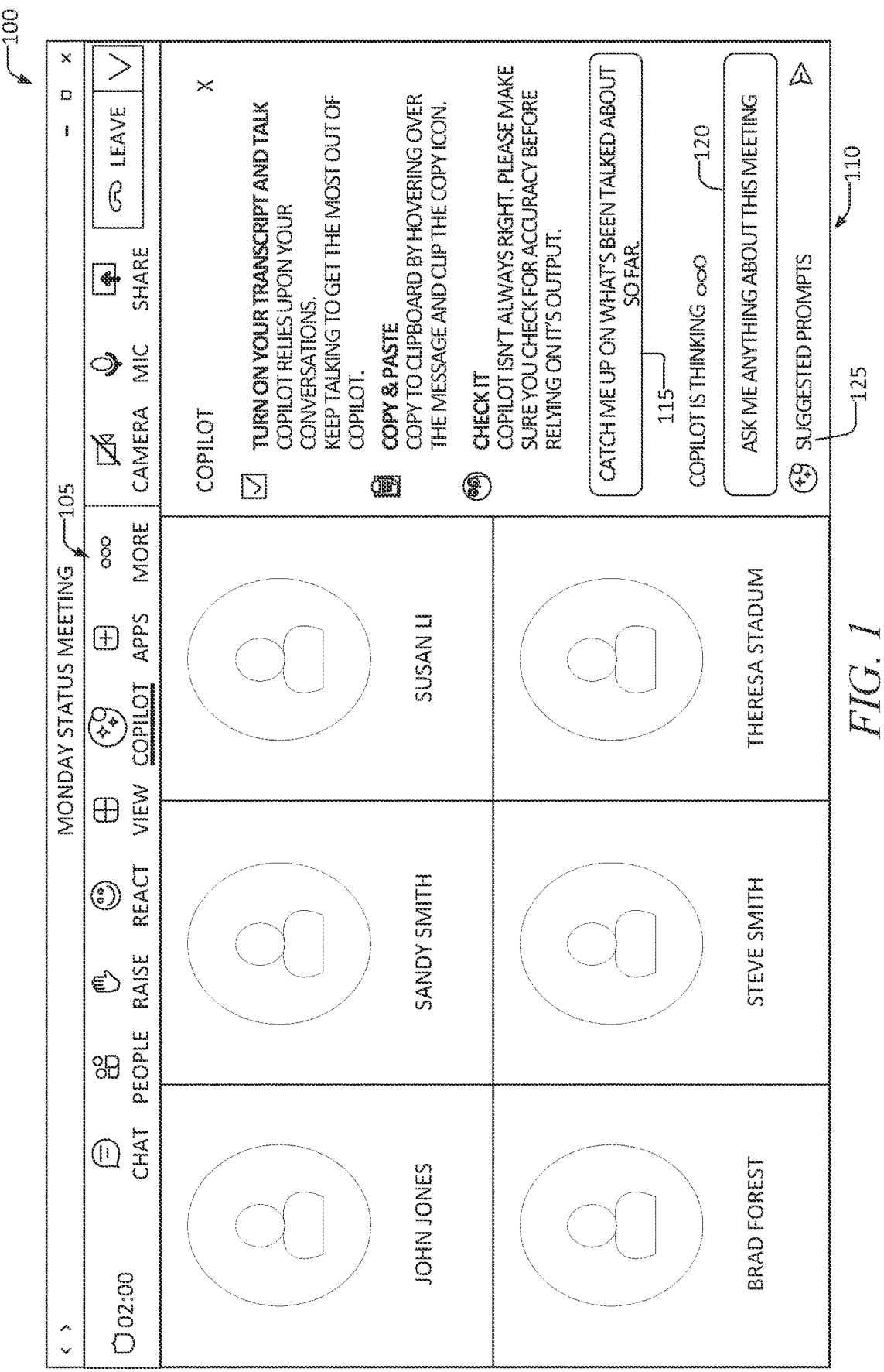

Network-based communication sessions, such as network-based meetings, especially those involving many participants are often rapid-fire environments where participants may struggle to keep up with the action. One errant thought, one distraction, one screaming child in the background may distract a participant long enough to miss important parts of the network-based communication session. While a participant may ask for clarification, this is often disruptive or embarrassing, especially for participants who may be shy.

Network-based communication sessions may also be very long, often several hours, to the point that it may be difficult for participants to remember decisions made, opinions of participants, pros and cons of ideas, and the like. Participants may thus struggle to accurately remember or understand decisions that have been made, action items that are outstanding, open questions, and other aspects of the network-based communication session. In addition, the group may have differing recollections of these facets of the communication session such that accurate reconstruction may be impossible.

In addition, participants may experience moments of the communication session where the group's progress appears "stuck." That is, the participants may not have a clear path forward toward achieving their goals for the communication session. This may be as a result of disagreements between participants, uncertainty about decisions to-be made, and the like. In addition, late-arriving participants may struggle to catch up with what has already been decided or discussed.

Finally, after the meeting, participants may have difficulty remembering what happened during the communication session. Additionally, individuals with scheduling conflicts that were unable to participate may have difficulty understanding decisions that were made, topics that were discussed, and the like.

One tool that can assist users during network-based communication sessions with these problems is the live transcript. The network-based service translates voice conversation data in real time to generate a voice transcript of the communication session. Despite this transcript, it may take quite some time for the user to scroll back to find the information they are searching for. In a real-time and dynamic communication session, the user may have to take their focus off the communication session to find the information they are looking for which may result in them missing even more content. In addition, the live transcript traditionally does not include content shared during the communication session, thus the transcript may be either incomplete or lack important context.

Disclosed in some examples are methods, systems, and machine-readable mediums for providing a network-based communication session copilot. The network-based communication session copilot may be a personalized assistant to a communication-session participant that provides information and advice about the network-based communication session. For example, the copilot may answer participant questions during or after the network-based communication session about the session such as about shared content such as the transcript, chats, files, screen sharing; previous communications such as emails, chats, documents, and content from previous communication sessions; and the like. Example tasks include summarization of the communication session, identification and summarization of different topics in the communication session, list of participant opinions, open questions, concrete questions on content shared or discussed during the communication session, specific questions about participants, and the like. In some examples, the copilot may provide information about the communication session after the communication session.

In some examples, participants may interact with the copilot in a number of ways. For example a participant may ask the communication session copilot free-text, natural language questions and receive natural language responses. In other examples, the copilot may anticipate the questions of participants. For example, the copilot may recommend, from a prespecified list of questions, one or more of the most relevant questions to ask based upon the current communication session content, the role of the user in the session, previous questions and answers of the participant, and/or the like. The communication session copilot may suggest follow up questions based on the communication session content, the question, and previous answers. In some examples, the copilot may proactively initiate an answer to a question the user has not yet asked. In some examples, the copilot may scan the meeting transcript periodically and prompt a participant. For example, by stating "John is asking you about" a particular topic.

In some examples, the communication session copilot may personalize the answers based upon the user's style. For example, the copilot may determine a user's style and/or interests from the phrasing used from submitted free text queries (in this communication session or previous sessions of the user), what the user says during the communication session (e.g., from the communication session transcript), and other contextual signals. Example style changes include providing more concrete answers if the user prefers more concrete results and if the user has more doubts, the answer could provide different options. For example, the copilot may learn what is relevant and interesting to the user across different meetings and apply those lessons to providing a relevant answer. Other example styles may include short and concise answers vs. detailed answers; answer formatting (table vs bullets vs paragraphs); quoting the transcript vs having a summary; and/or formal language or casual language.

Example information provided may include a summary of what has been discussed so far, provide decided-upon action items, provide information on participants (e.g., such as a current speaker), determine unresolved questions, determine varying opinions, list main ideas discussed, and the like. The communication session copilot may automatically summarize a communication session for a late-joining participant (e.g., with or without a participant requesting it), provide suggestions for driving the communication session forward, help users break the ice (e.g., provide stories, jokes, or the like), highlight different perspectives, suggest polls when asking questions with choices, and the like. Example suggestions for driving the communication session forward include providing questions that participants can ask-which may be leading questions, provide pros and cons of a particular decision point, enrich the discussion with world knowledge and different perspectives, and the like. In addition, the copilot may identify when the conversation strays from a submitted agenda and provide prompts for users to get the communication session back on target.

In some examples, the copilot may be specific and private to each participant. That is, each participant may have a private instance of copilot that may be isolated from other participants. In these examples, questions a participant asks and answers provided may not be visible to other participants. In other examples, a collaborative copilot may be provided instead of, or in addition to the private copilot. The collaborative copilot may be a shared experience for all participants. Example collaborations include notification of users when a topic is discussed, or when a different opinion is discussed; identify when the conversation goes off the agenda; highlight different perspectives; and suggests polls when asking questions with choices; question and answer that all can see; allowing users of the communication session to edit the answers, capturing action items and notes; and the like. When users edit answers provided by the communication session copilot, the system may adapt the model so that future answers learn from the explicit feedback given by the users. In some examples, both a collaborative copilot and a private copilot may be provided.

In some examples, the copilot may utilize the communication session transcript, chats, files, and/or any audio or video shared during the current communication session. In some examples, the copilot may utilize communication session transcript, chats, files, and/or any audio or video of previous communication sessions that are related to the current communication session (e.g., previous recurring communication sessions). In still other examples, the copilot may utilize participant emails, files, and other content. The copilot may utilize one or more machine-learned language model to provide the above disclosed functionality. Example machine-learned language models include large language models (LLMs) such as a Generative Pre-Trained Transformer (GPT) model.

In some examples, multiple models may be utilized. For example, an intermediate model may process user input (e.g., the user query), the communication session transcript, the role of the user in the communication session, communication session metadata (time of the communication session, title of the communication session, list of participants, communication session location, communication session agenda, and the like), transcripts of past relevant communication sessions, and the conversation history of the participant with the copilot. Based upon these inputs, the intermediate model may then generate one or more prompts to the LLM. The answers from the LLM may be processed and then provided back to the user.

In some examples, the intermediate model may add to the prompts to the LLM a question to determine possible follow up questions or queries. In parallel to providing the response to the original query to the user, the intermediate model may query the LLM on the answers to the follow up questions. In this way, the system predicts user questions and pre-caches the answers to avoid additional latency.

In some examples, input to large language models such as GPTx are limited in size. Such input is typically in the form of a textual context and an instruction. Accordingly, handling long context is nontrivial. Transcripts of short network-based communication sessions may fit into the input constraints of these models. However, long network-based communication sessions, such as those exceeding sixty minutes have transcripts that far exceed the input limit to these models. This makes it non-trivial to generate different types of summaries, and, more generally and more dynamically, executing user queries in free text to extract information and answer questions about the communication session.

In some examples, the copilot may submit additional meeting content such as videos, shared documents and the like to the LLM. In some examples, the intermediate model may determine relevant information and then provide those results to the LLM together with the transcription. In other examples, the copilot may use the intermediate layer to identify the relevant sections from the files/chat etc. and feed the original sections to the model as text together with the transcription and query to the model. In still other examples, the copilot may add the document to the model prompt if it fits into the input or make several prompts to the model if it doesn't fit and combine the results with a final prompt (e.g., as detailed below for the transcripts). In some examples, to determine relevant information from additional context, the intermediate model may utilize deep learning AI techniques such as convolutional neural networks (CNN).

In some examples, the communication session copilot may solve these problems by utilizing an iterative submission process to the LLM. In some examples by using a summary of summaries where context info (e.g., the transcript and/or shared content) may be partitioned into sections Each section is then summarized to create sub-summaries. The sub-summaries are then summarized to create an overall summary. In other examples, a rolling summary may be used. Starting from an initial summary, the summary is iteratively extended to cover each successive section until the entire context is covered. For user queries on the text, the query may be used to create a rolling summary that includes all the relevant details for the query and the query may then be applied on the completed summary.

SUMMARY OF SUMMARIES

To process large transcripts, a first embodiment partitions the transcript T of the network-based communication session into N sections $\{T_1, T_2, \ldots, T_N\}$. A summary S is created of each section to create N summaries $\{S_1, S_2, \ldots, S_N\}$. An overall summary $S_{Output}$ is created that summarizes all of the individual summaries. In some examples, the communication session copilot may adjust the style of the summaries (e.g., make them short) and their content and form (e.g., include only action items or create a summary in table form) by including elaborate instructions in the prompts to the LLM. One of the major advantages of this summary of summaries method, is that the first phase of creating section summaries, can be easily parallelized, such as by using a map-reduce framework. Nonetheless, section summaries may be generic and high-level, or wrong, apparently due to lack of context. In some examples, to solve the problem of lack of context, the system may overcome this by creating an overlap in the sections. Thus, for example, a portion of $T_1$ overlaps $T_2$. In some examples, an ending portion of $T_1$ overlaps a beginning portion of $T_2$. In some examples, the summary of summaries may be parallelized. That is, each of the N summaries may be created simultaneously or near-simultaneously and then combined in the final result. In some examples, the overlap may be a particular number of sentences, such as 6-8.

Rolling Summary

To overcome some of the challenges with the summary of summaries approach, in some examples, a rolling summary may be used. As with the summary of summaries, the transcript may be divided into N sections $\{T_1, T_2, \ldots, T_N\}$. A summary $S_1$ is created from the first section $T_1$. Then, given $S_1$ and given the transcript of the second section $T_2$, the summary is extended to also cover section 2. The process is repeated iteratively extend the summary to cover $T_3$ and so on until $T_N$ is processed and the summary is completed. This way, via a rolling summary, each section generally gets the entire backward context in compressed form. Note that the partitioning of the transcript can be done on-the-fly-in each step, considering the actual size of the rolling summary. Also, and as previously noted, the prompts may be modified and extended in several ways; e.g., the style, content, and form of the summary can be easily adapted.

Queries in Free Text

The summaries described above may be useful to get some details on the communication session, but they may not always be helpful in answering many of the more specific questions about the communication session. In order to answer user queries in free text, the system may utilize another technique. For short transcripts, the prompt to the LLM may include the transcription and/or other context; and the user query with an instruction to answer the user query based upon the transcript. In some examples, the instructions may be augmented with additional system instructions.

In case the context (e.g., the transcript) is too long, the system may not be able to use the LLM to directly query it. Nonetheless, the system can use the rolling summary approach in order to create an ad-hoc summary of the text that is focused on the provided query, and then use that ad-hoc summary to answer the query. For example, the system may first prompt the language model to summarize a first part of the communication session and including all the details from the communication session that are needed or may directly help to later provide an answer to the query. The LLM may be directed to refrain from mentioning the query itself, but to still include the relevant details. After the summary is produced using the previous query, the copilot may issue a second command that includes the user's query, the summary of a first part, and a transcript of a next part. The LLM is instructed to create an extended summary covering the first part of the communication session and the next part of the communication session, including all the details (if any) that are needed or may directly help or later provide an answer to the user query. This prompt may be used iteratively until the entire transcript is consumed. Finally, to execute the query given a query-aware summary of the entire communication session, a prompt to the LLM may be submitted that includes the query-aware summary, and the user query. The prompt asks the LLM to answer the user query based upon the summary of the communication session.

In other examples, to answer a query, each transcript segment is not summarized but rather, the copilot asks the LLM to answer the original question (query) on each segment independently, and then the responses are combined. In these examples, this may utilize a map-reduce framework to parallelize the process. In some examples, when using this method, the query Q may be converted into another query Q2 that is used in and contains more information than Q, and better supports turning the several responses into one. For example, turning the query Q="Is alternative A better than B?" (which is a yes/no question that is hard to "reduce") into "What are the pros and cons of A and B" (which is much easier to reduce).

In still other examples, the summary of summaries approach may be modified. For example, a query-aware summary of each portion of the context is constructed (the summary of each part is instructed to include all the necessary details to answer the query). These individual summaries are then summarized into one final summary and this final summary is used to answer the query by prompting the model.

In some examples, the copilot may compress the context by creating a concise summary that removes redundancies and repetitions but leaves relevant details. For example, by removing repetitions, mumblings, fill words ("ah," "um", etc.). This may be done by utilizing the LLM to remove these irrelevant details. In other examples, a list of irrelevant phrases may be used to remove them from the context.

Alternatively, the system may generate a few compressed texts, each covering a different aspect (e.g., topic—such as technology, management, etc. . . . ), and the model may be used to select the relevant one given the query. To control the experience, and the "character" of the model, more context may be provided in the prompts.

By leveraging these techniques, the copilot may provide assistance to participants of a communication session. For example, if a participant joined late to a session, they may be reminded to catch up on what they might've missed using the copilot. The copilot may show a topic-based summary allowing them to catch up quickly without needing to interrupt the ongoing conversation.

As another example, when a communication session is about to end, participants may be automatically asked to wrap up the communication session and notes will be automatically generated on their behalf to highlight key topics and action items. As yet another example, if a conversation is going off agenda, participants may get a prompt that conversations should be pulled back to an item on the agenda. In these examples, the agenda may be submitted by an organizer of the communication session. In some examples, the copilot may proactively detect divergent opinions, emotions/tensions, and/or whether goal is achieved in a communication session and notify participants with suggested actions to improve session effectiveness. The copilot system may use prompts (free text, pre-defined and suggested by AI) to enable participants to reach shared understanding on what's discussed.

This real-time analysis of conversations in a communication session may use one or more of transcribed speech, chat messages, agendas, attached documents, title, other communication session artifacts, with crafted prompts that produces relevant and accurate results, on top of a large language model.

For participants that had to leave the communication session early, they can ask the communication session copilot to catch up on what they missed after they left and get more context on action items assigned to them. Likewise, for participants who didn't attend the communication session, they can see notes generated by AI and ask the communication session copilot to get deeper context on what's discussed, without needing to watch the recording or read the transcript. If a user was on vacation for x days, they can ask the communication session copilot to recap communication sessions they missed during that time, and highlight what's important for them as well as action items, without needing to go back to notes/recording/chat to catch up.

The disclosed methods, systems, and machine-readable-mediums thus solve the technical problems of managing information in network-based communication sessions by improvements in interactions and usability and user efficiency. In addition, the disclosed techniques solve problems related to limited input sizes of LLMs through technical iterative processing solutions. In addition, the proposed solutions solve technical challenges of utilizing an LLM on live, dynamic content, such as a network-based communication session through technical solutions of iterative processing, intermediate models, and/or the like. In some examples, the proposed techniques utilize specific rules or models to generate prompts to the LLM that increase the reliability and usability of the information from the LLM and remove the human judgment from the prompts to the LLM to create more consistent results.

FIG. 1 illustrates a GUI 100 of a network-based communication application providing in a network-based communication session according to some examples of the present disclosure. In the example of FIG. 1, the network-based communication session is a network-based meeting. The GUI includes a toolbar 105 with options for leaving the communication session; sharing content; muting or unmuting a microphone; enabling or disabling video; starting other applications; changing a view; leaving a reaction; raising a virtual hand; viewing a list of people; viewing a chat, viewing the copilot; and the like. In the example of FIG. 1, the copilot view is selected. This brings up the copilot pane 110. The copilot pane 110 includes a suggested query with a selectable control 115 to execute a query to "catch me up on what's been talked about so far." In addition, a text box 120 allows users to enter custom natural language queries, and a selectable control 125 that displays additional suggested queries. Custom, free text prompts to the large language model may allow participants to ask the copilot any question about the meeting in progress, past meetings, or the like.

Figure 2:
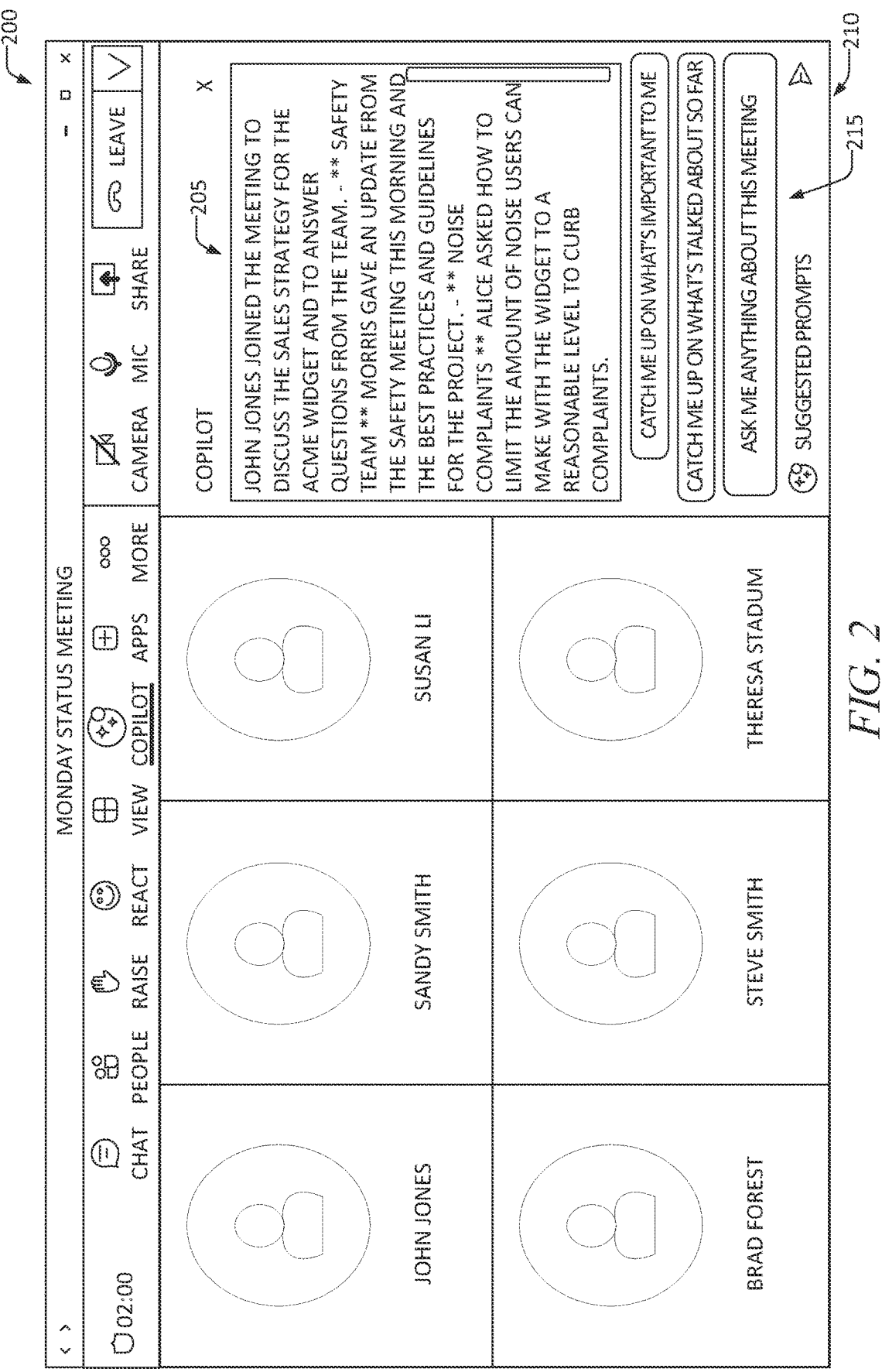

FIG. 2 illustrates a GUI 200 of the network-based communication application engaged in a network-based communication session according to some examples of the present disclosure. FIG. 2 illustrates the GUI 100 after the participant has selected the selectable control 115. The copilot pane 210 shows a natural language answer 205, as well as a plurality of selectable controls 215 that allow the participant to submit one or more suggested queries.

Figure 3:
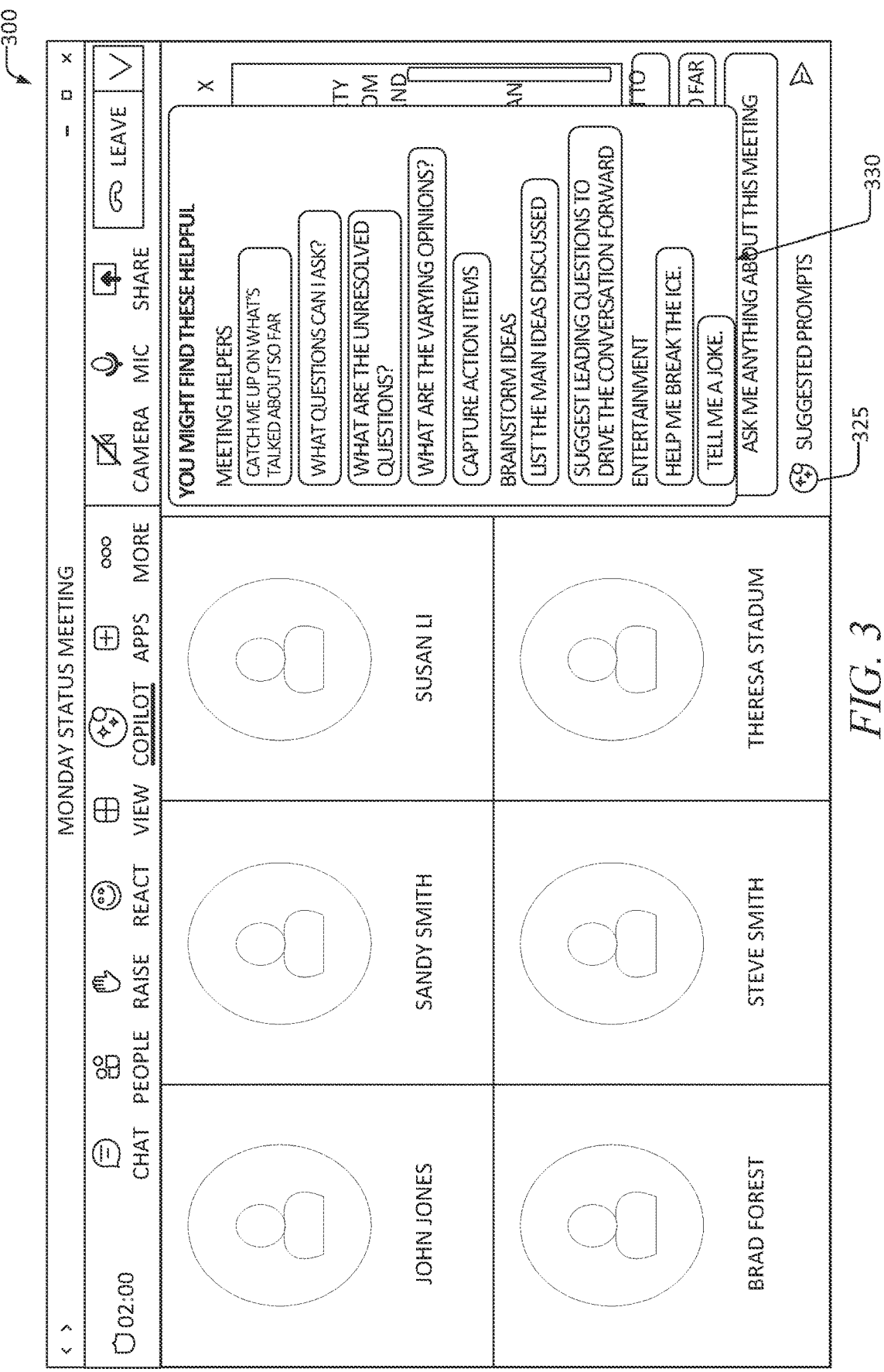

FIG. 3 illustrates a GUI 300 of the network-based communication application engaged in a network-based communication session according to some examples of the present disclosure. FIG. 3 illustrates the GUI 100 after the participant has selected the selectable control 325 to show the suggested prompts. The GUI 300 displays a list of selectable controls 330 with various suggested queries.

Figure 4:
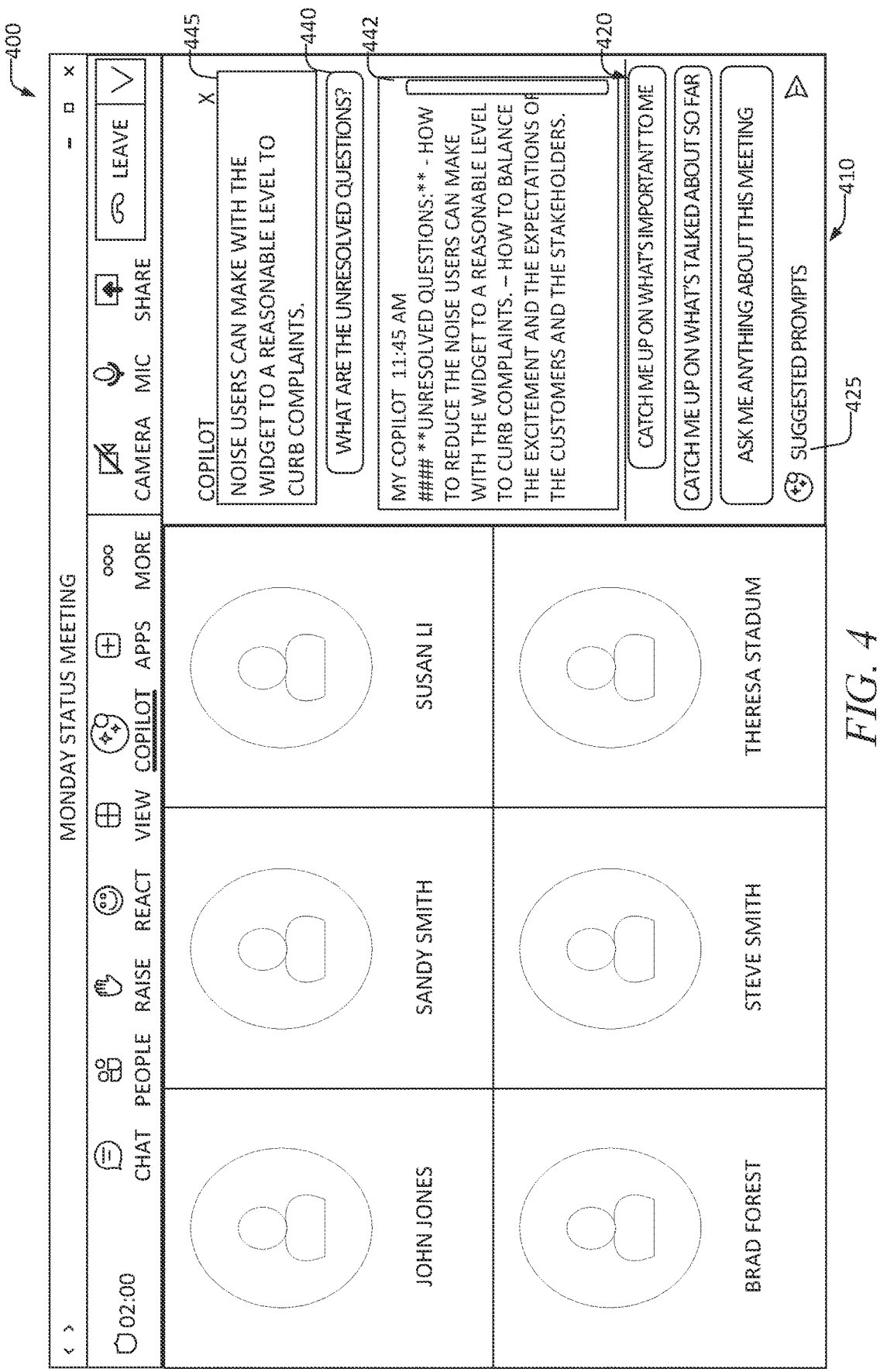

FIG. 4 illustrates a GUI 400 of the network-based communication application engaged in a network-based communication session according to some examples of the present disclosure. FIG. 4 illustrates a GUI 400 with a copilot pane 410. Copilot pane 410 includes a variety of queries and answers. For example, a first answer 445 (the query of which is not shown (e.g., in some examples, it may be visible by scrolling upward), with a second question 440 and second answer 442. The second answer 442 may be scrollable such that the entire answer may be accessed by scrolling up and down within the response box. Selectable controls 420 show various suggested prompts. Suggested prompts selectable control 425 may show additional selectable controls for additional suggested prompts.

Figure 5:
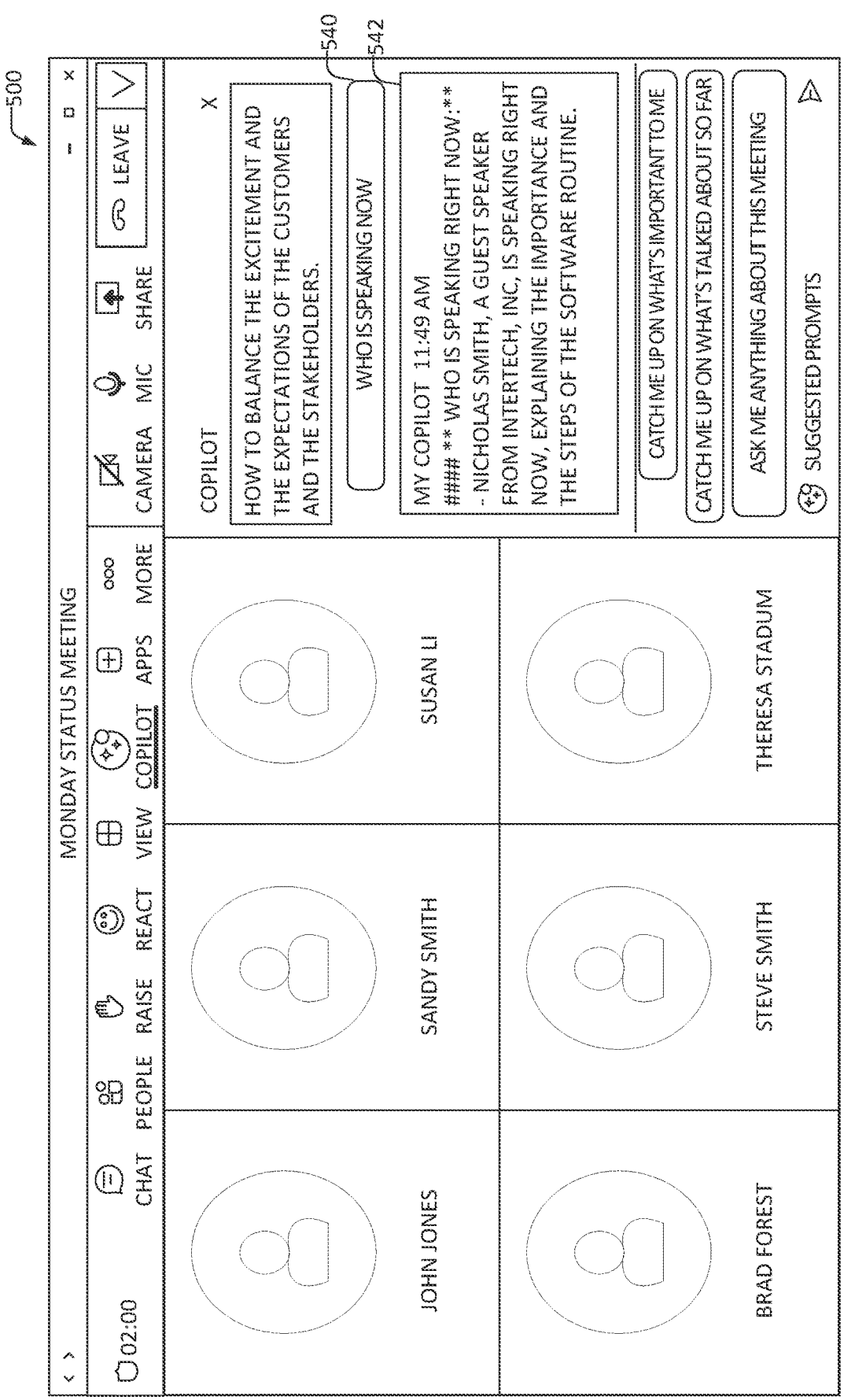

FIG. 5 illustrates a GUI 500 of the network-based communication application engaged in a network-based communication session according to some examples of the present disclosure. The GUI 500 shows a prompt of "who is speaking now" at 540. The response 542 includes a name as well as information about the current speaker. Furthermore, context information about the speaker related to the current communication session may be shown. For example, in FIG. 5, not only is the user's name and company present, but the fact that they are a "guest" speaker and also what the speaker is talking about. This information may be obtained by participants introducing the speaker, by directory services, or the like.

Figure 6:
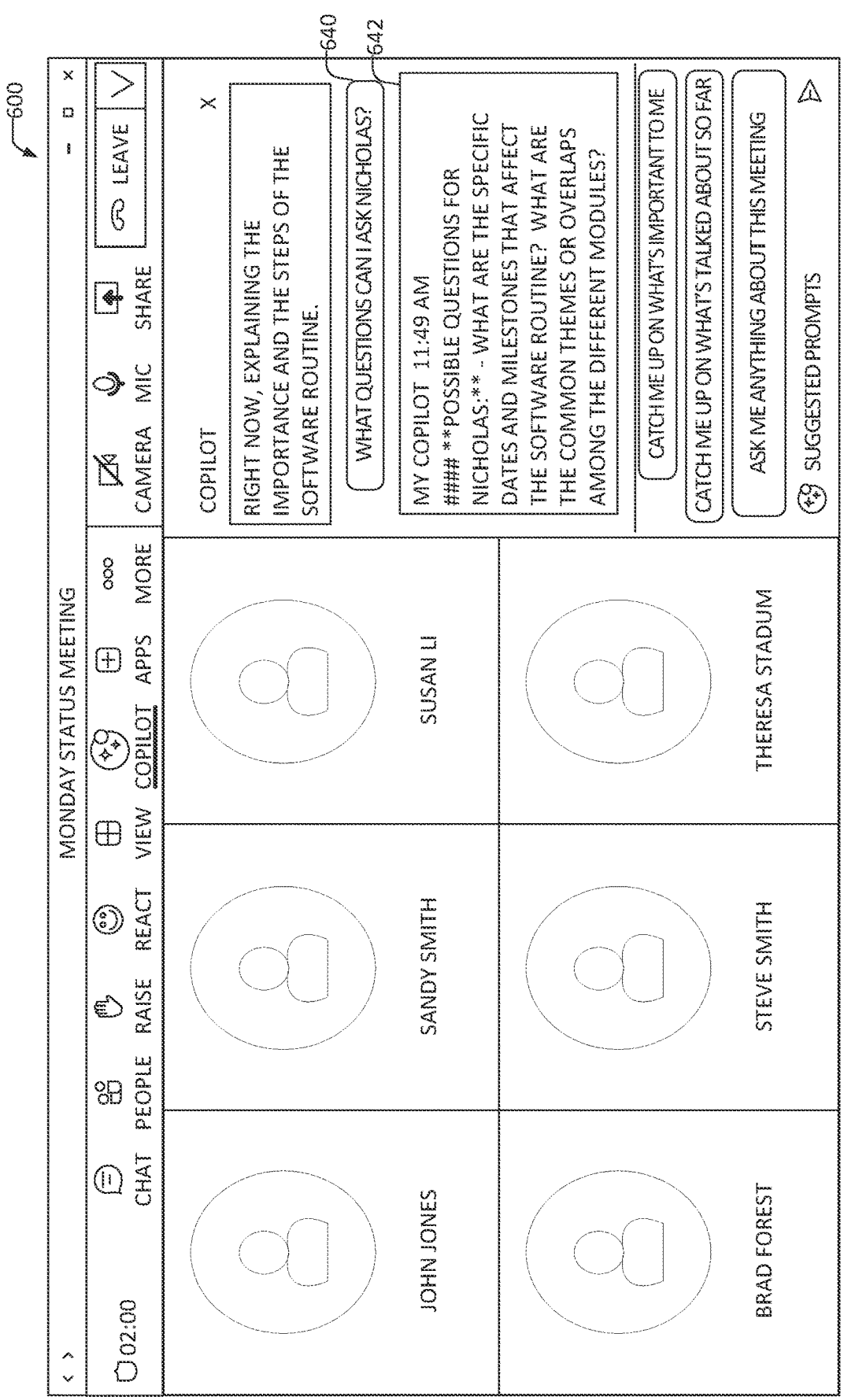

FIG. 6 illustrates a GUI 600 of the network-based communication application engaged in a network-based communication session according to some examples of the present disclosure. GUI 600 is a continuation of GUI 600 where the user has asked "what questions can I ask Nicholas?" at 640. The copilot has responded at box 642 with possible questions.

Figure 7:
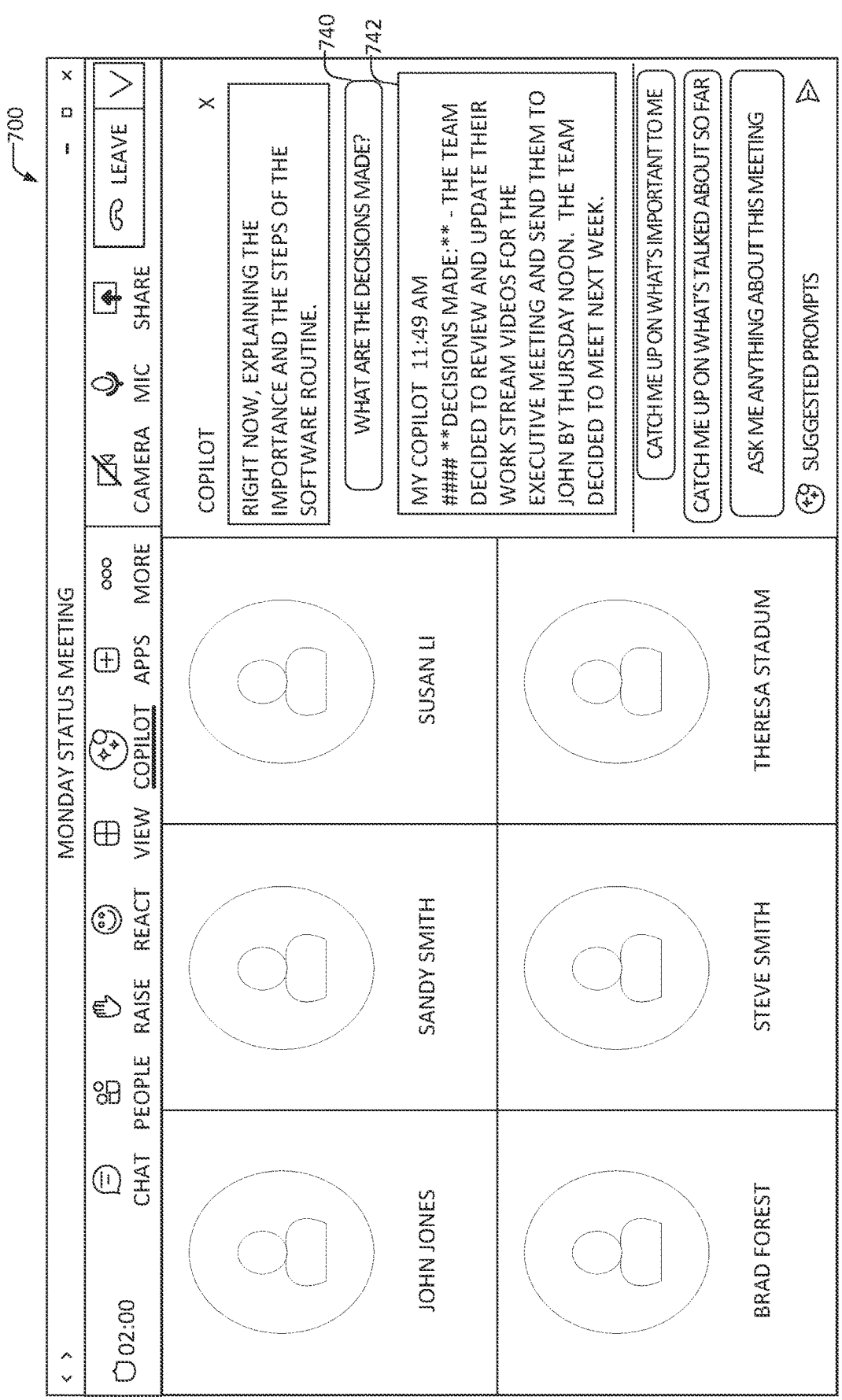

FIG. 7 illustrates a GUI 700 of the network-based communication application engaged in a network-based communication session according to some examples of the present disclosure. GUI 700 is a continuation of GUI 700 where the user has asked "What are the decisions made?" at 740. The copilot has responded at box 742 with decisions that the team has made.

Figure 8:
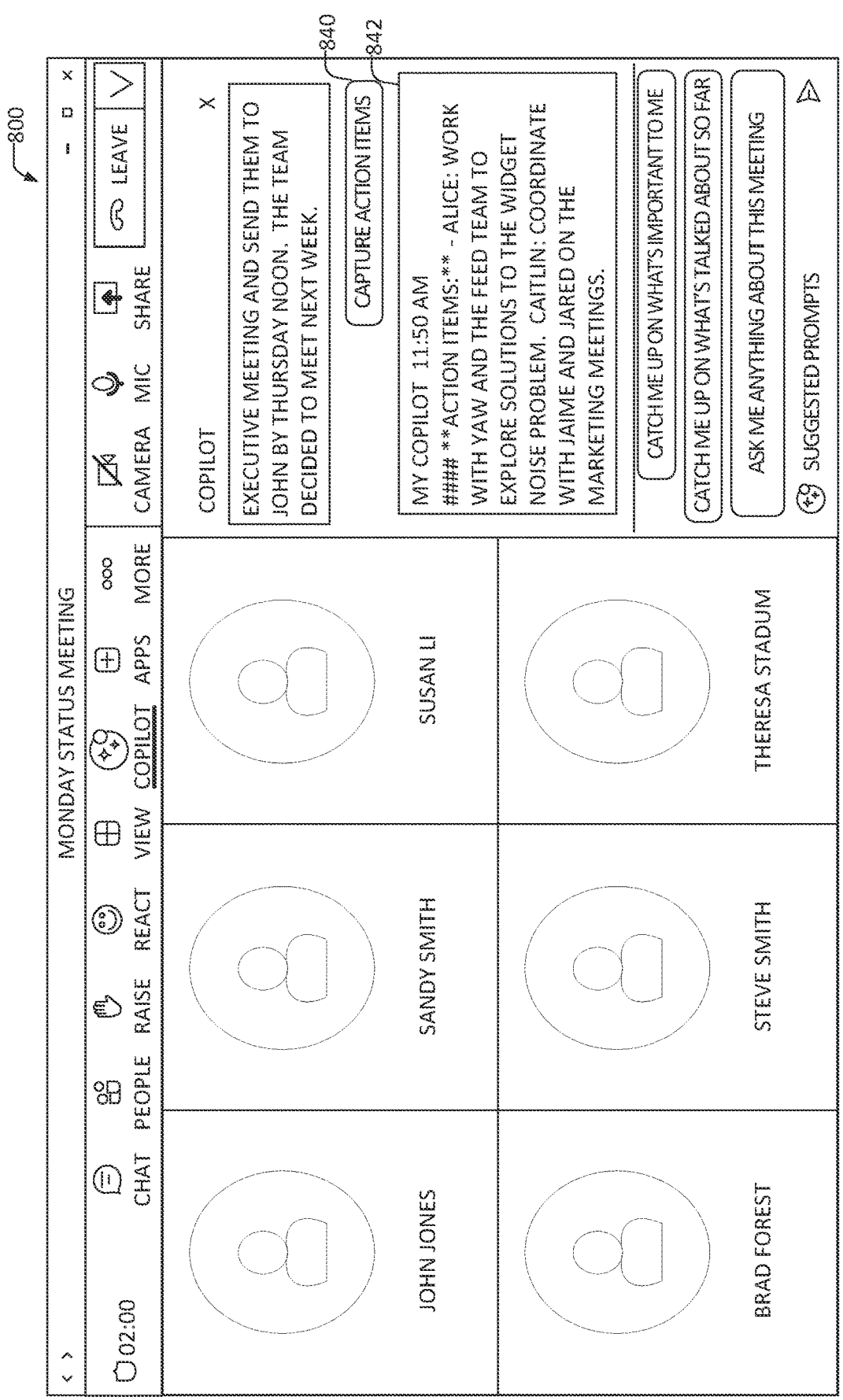

FIG. 8 illustrates a GUI 800 of the network-based communication application engaged in a network-based communication session according to some examples of the present disclosure. GUI 800 is a continuation of GUI 800 where the user has asked the copilot to "capture action items" at 840. The copilot has responded at box 842 with action items.

Figure 9:
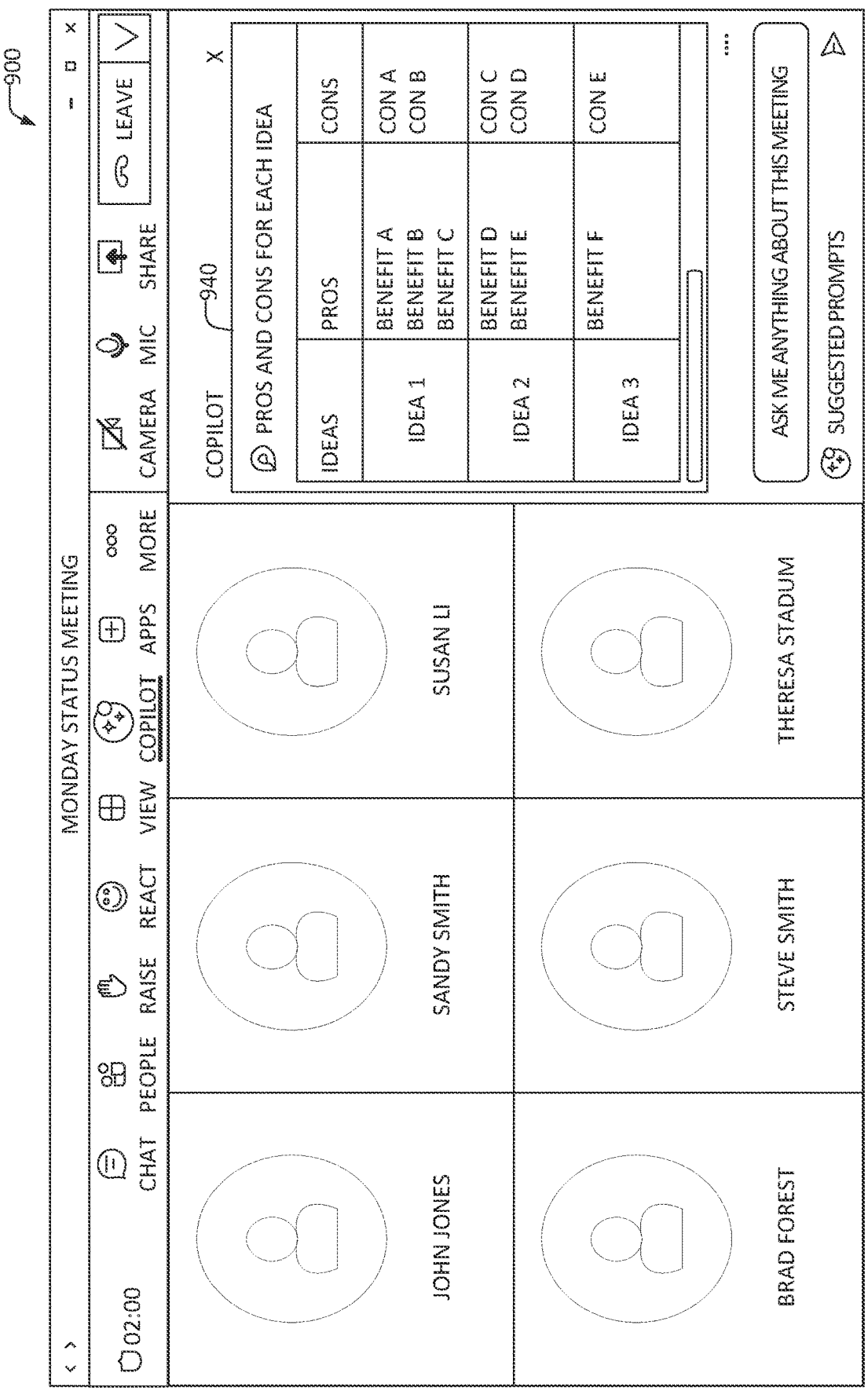

FIG. 9 illustrates a GUI 900 of the network-based communication application engaged in a network-based communication session according to some examples of the present disclosure. GUI 900 shows a table of pros and cons 940 for each idea expressed during the communication session. The pros and cons are taken from the content of the network-based communication session such as the pros and cons discussed by participants.

Figure 10:
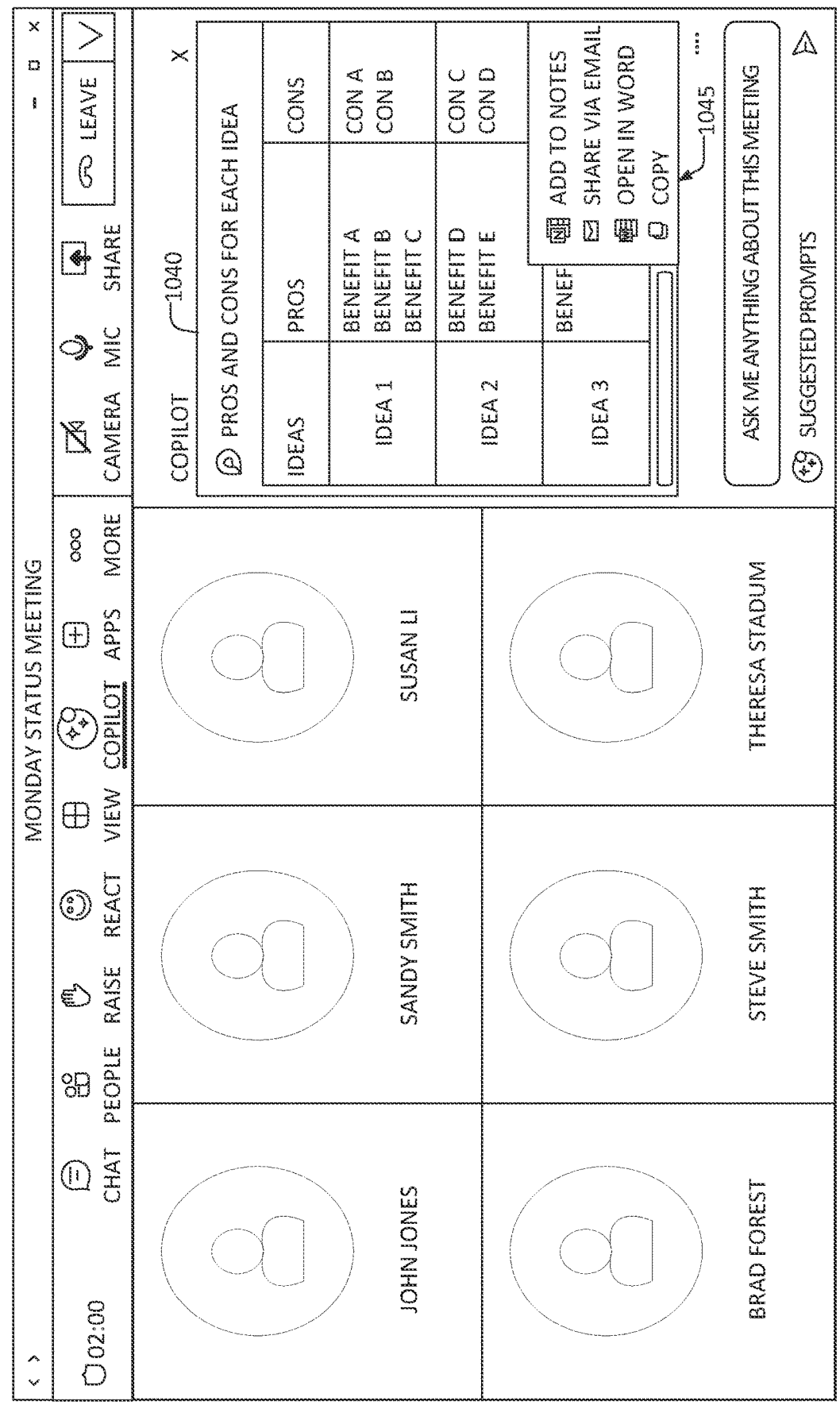

FIG. 10 illustrates a GUI 1000 of the network-based communication application engaged in a network-based communication session according to some examples of the present disclosure. GUI 1000 shows a table of pros and cons 1040 for each idea expressed during the communication session. The user has selected a selectable control that brings up a menu 1045 that allows the participant to copy the table to a notes section of the network-based communication application, send the table via email, open it in a word processing application, copy it to a clipboard, or the like.

FIG. 11 illustrates a GUI 1100 of the network-based communication application engaged in a network-based communication session according to some examples of the present disclosure. The GUI 1100 is of a notes section of the network-based communication application that presents notes of the network-based communication session. The notes section 1120 may include manually taken notes, notes produced by the copilot, and the like. Shown in the notes section 1120 is the pros and cons table from FIG. 10. Additionally, communication session goals, key topics, and varying opinions may be populated by the copilot. In some examples, the notes section 1120 may utilize a template, where the fields of the template are auto-filled by copilot as the communication session progresses. The notes section 1120 may also be edited by participants collaboratively.

Figure 12:
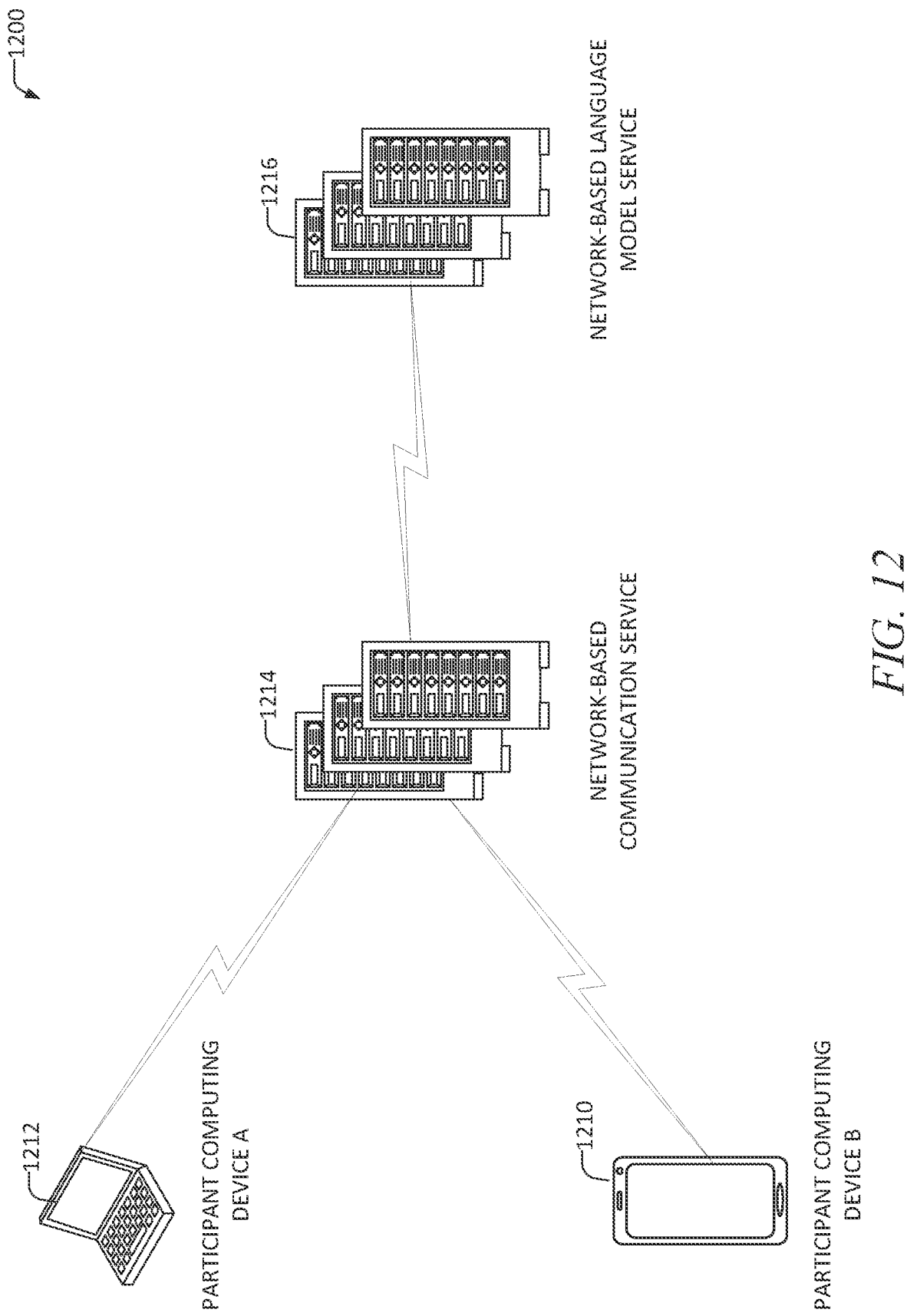
FIG. 12 illustrates a network-based communication session environment according to some examples of the present disclosure.

FIG. 12 illustrates a network-based communication session environment 1200 according to some examples of the present disclosure. Participant computing device A 1212 and participant computing device B 1210 may communicate with a network-based communication service 1214—e.g., over a computing network. The network-based communication service 1214 may provide the network-based communication session by receiving audio, video, content, screen sharing, and other data from each participant computing device and forwarding that data to other computing devices of other participants.

In some examples, copilot commands and/or queries may be processed locally on the participant computing devices. That is, the models such as the LLMs may be downloaded to the participant computing devices locally. In other examples, the models may be within the network-based communication service. Commands, queries, prompts, and other requests of the copilot may be sent from the participant computing devices to the network-based communication service 1214. In some examples, the models are at the network-based communication service 1214. In other examples, one or more models are located at a different network-based service such as a network-based language model service 1216 that is reachable over a network from network-based communication service. The commands, queries, prompts, and other requests of the copilot may be forwarded to the network-based language model service 1216. In some examples, the network-based communication service 1214 may host an intermediate model, such as that described in FIG. 13.

Figure 13:
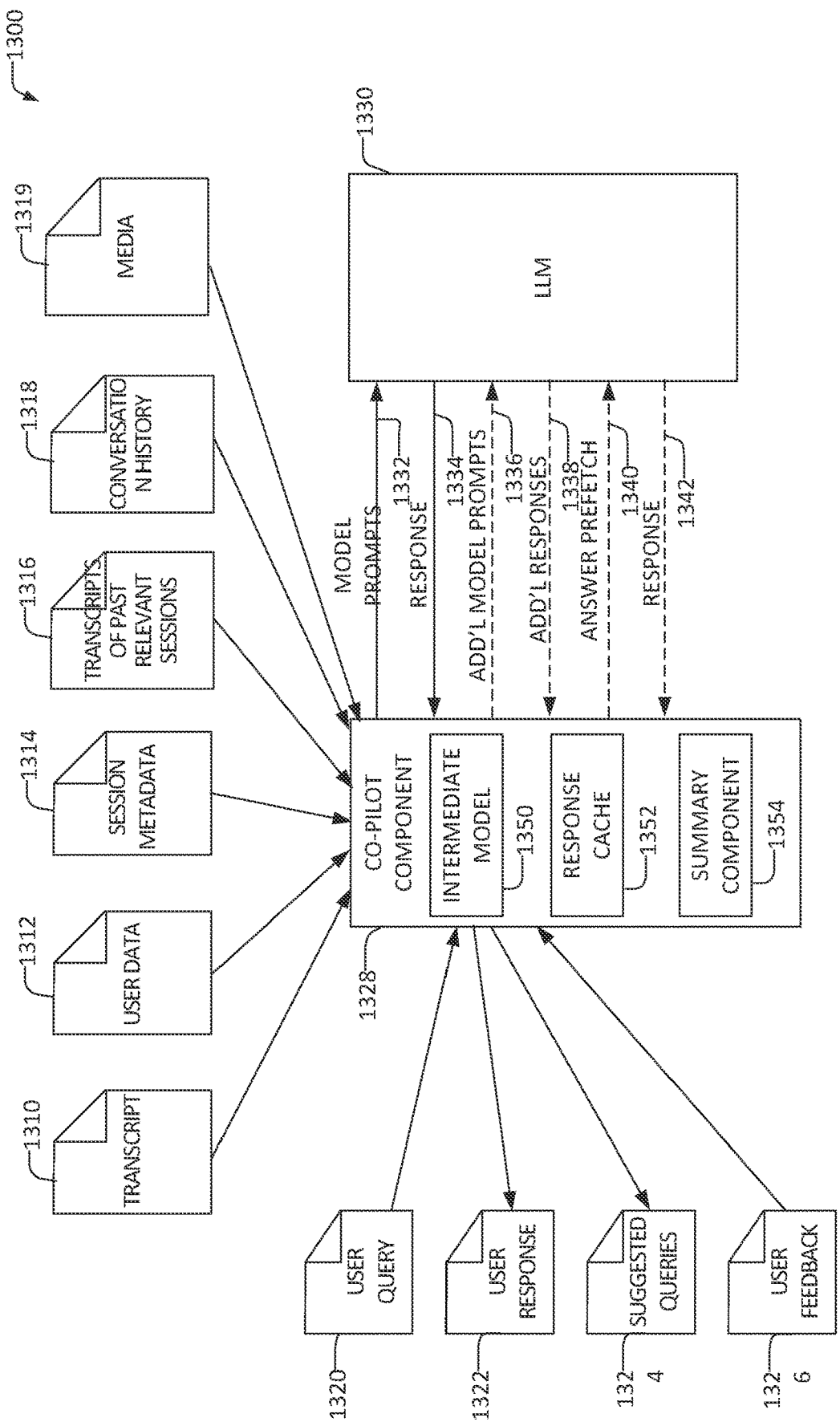
FIG. 13 illustrates a logical diagram of a copilot system according to some examples of the present disclosure.

FIG. 13 illustrates a logical diagram of a copilot system 1300 according to some examples of the present disclosure. The copilot component 1328 may be part of the network-based communication service (such as network-based communication service 1214), or the network-based language model service (such as network-based language model service 1216) in some examples and intermediates between the communication session participant and the LLM 1330. For example, a user's query 1320 (either a free-text query, or one or more prespecified queries) may be submitted to the copilot component 1328. Additionally, a current live transcript 1310 of the communication session, user data 1312, other communication session metadata 1314 (participant locations, number of participants, time of the session, current duration of the session, communication session agenda, participant information, session title, and the like), transcripts of past relevant sessions 1316 (e.g., if the communication session is a recurring communication session other past communication sessions of the series; other communication sessions with similar or a same subject; other communication sessions with similar or a same title and/or agenda, or the like), a conversation history between the user and the copilot in this session and/or other relevant sessions 1318, media shared during the communication session 1319 (including files, screen sharing, videos, communication session chat history between participants, and the like), and the like. In some examples, user data 1312 may include a role of the user in the communication session (e.g., organizer, presenter, leader, manager, or the like), a name of the user, a title of the user, an organization of the user, and the like.

These inputs may be used by the copilot component 1328 along with the user query 1320 to produce one or more model prompts 1332. The model prompts may be generated by the copilot component 1328. For example, the copilot component 1328 may use an intermediate model, such as intermediate model 1350 to generate the prompts. In some examples, the intermediate model 1350 may be a rule-based model that may utilize one or more rules that select one or more template model prompts that are then completed using the inputs to the copilot component 1328 and output as the model prompts 1332 to the LLM 1330. In other examples, other than rules, other models may be used, such as for example random forests, decision forests, another LLM, or the like.

In some examples, the intermediate model may utilize pre-defined templates for creating the prompt. Given the input and additional parameters as the user's question and copilot interaction history copilot may utilize a classifier which selects the best prompt for the LLM. In other examples, a generative model may use certain building blocks for the prompt based upon the inputs discussed above. This model is trained to generate a prompt given the user's input, the response of the model and a label whether this response is good.

LLM 1330 may be a large language model. Examples include GPT models. The LLM 1330 operates on natural language input prompts, such as model prompts 1332 and generates a natural language response, such as response 1334. The response may be interpreted by the copilot component 1328 to determine if additional prompts are to be issued. Additional prompts 1336 may be issued and responses 1338 may be received. Multiple rounds of prompts and responses may be issued by the copilot component 1328 to the LLM 1330 for a single user query 1320 depending on the query. For example, to generate the pros and cons for each idea, a first prompt may obtain the list of ideas, and the LLM 1330 may be queried for each idea to find the pros and cons of that idea. In addition, multiple prompts may be, for example, to produce a summary (e.g., using the summary of summaries or rolling summary techniques) and then further prompts may be utilized to apply that summary to a particular query. Once the copilot component 1328 has the requisite information to answer the query, the copilot component 1328 may send a response 1322 to the participant.

In some examples, the model prompts may include prompts for the LLM 1330 to also include, in the response, likely follow up questions that the participant may have. As the copilot component 1328 delivers the response 1322, it may prefetch answers to those suggested queries 1340 and cache the responses 1342 using a response cache 1352. If the user asks one of those follow up questions, the answer may be served from the response cache 1352 of the copilot component 1328. This reduces latency for these queries by pre-storing the responses and thus improves the functioning of the computing system. In some examples, the pre-stored responses may have expiration times, after which, the cached answer is cleared. This prevents stale answers that are superseded by more recent events in the network-based communication session. The response cache 1352 may be volatile or non-volatile memory.

In some examples, the copilot component 1328 may produce one or more suggested queries 1324. These suggested queries may be based upon a role of the user, the content of the communication session, and the like. The suggested queries may be created by the LLM 1330, or the copilot component 1328. In some examples, the suggested queries may be chosen from a prespecified list of queries. In other examples, the suggestions are based upon the communication session content, previous answers, and recent queries of the users and may be suggested queries that are not prespecified.

Summary component 1354 may partition one or more portions of the inputs (such as transcript 1310, media shared during the communication session 1319, and the like). The summary component 1354 may then produce a summary, such as by using a summary of summaries, rolling summary, or summary for a query as previously described. In some examples, the sizes of the partitions of the portions of the inputs may be created using fixed sizes and an input limit for the LLM. For example, the difference between the input limit and the prompt language may be a maximum partition size. In other examples, the partition size may be dynamically created. For example, based upon the transcript length, the copilot history length, the LLM input limitation, user query length, expected output length, metadata length (user name, meeting title, meeting invitation body, etc. . . . ).

In some examples, the partitions may overlap. This may assist in preserving context for techniques like the summary of summaries. The amount of overlap may be prespecified. In other examples, the amount of the overlap may be dynamically calculated. For example by dividing the meeting into semantically separated segments, then either using non-overlapping sections or using a segment which is relevant to both the previous and next segments as the overlapping section.

Participants may provide user feedback 1326, which may be edits to the responses and/or suggested questions, and the like. This feedback may be used by the copilot component 1328 to update the intermediate model 1350 and/or refine the LLM 1330. When a user edits a response the system stores the changes and the uses the edits as additional input to the LLM. The edits are given in a different section in the prompt and then we ask the model to take these changes into account when answering the next question. This way copilot can fix erroneous utterances/words in the transcription, fix errors or emphasize specific details.

FIG. 14 illustrates a GUI 1400 of a collaborative copilot according to some examples of the present disclosure. The GUI 1400 may appear on a main stage portion of the network-based communication application. In some examples, the personal copilot may also be displayed simultaneously with the collaborative copilot. For example, the collaborative copilot may take the place of user's avatars or video squares, such as shown in FIG. 8. The collaborative copilot is a shared experience with all participants able to see and interact with a common copilot. The collaborative copilot may have a summary pane 1410 that shows a summary of goals, key topics, varying opinions, and other information about the communication session. The collaborative copilot may also include selectable graphical elements in another pane 1412 that allow participants to ask copilot questions such as "what's missing from the discussion?" "suggest new ideas related to topics discussed," "what topics need more clarification," "what are unresolved questions," and other options to explore. In some examples, the functionality of the collaborative view may be a restricted functionality of the private copilot. For example, queries about people in the meeting may not be allowed in the collaborative view.

Figure 15:
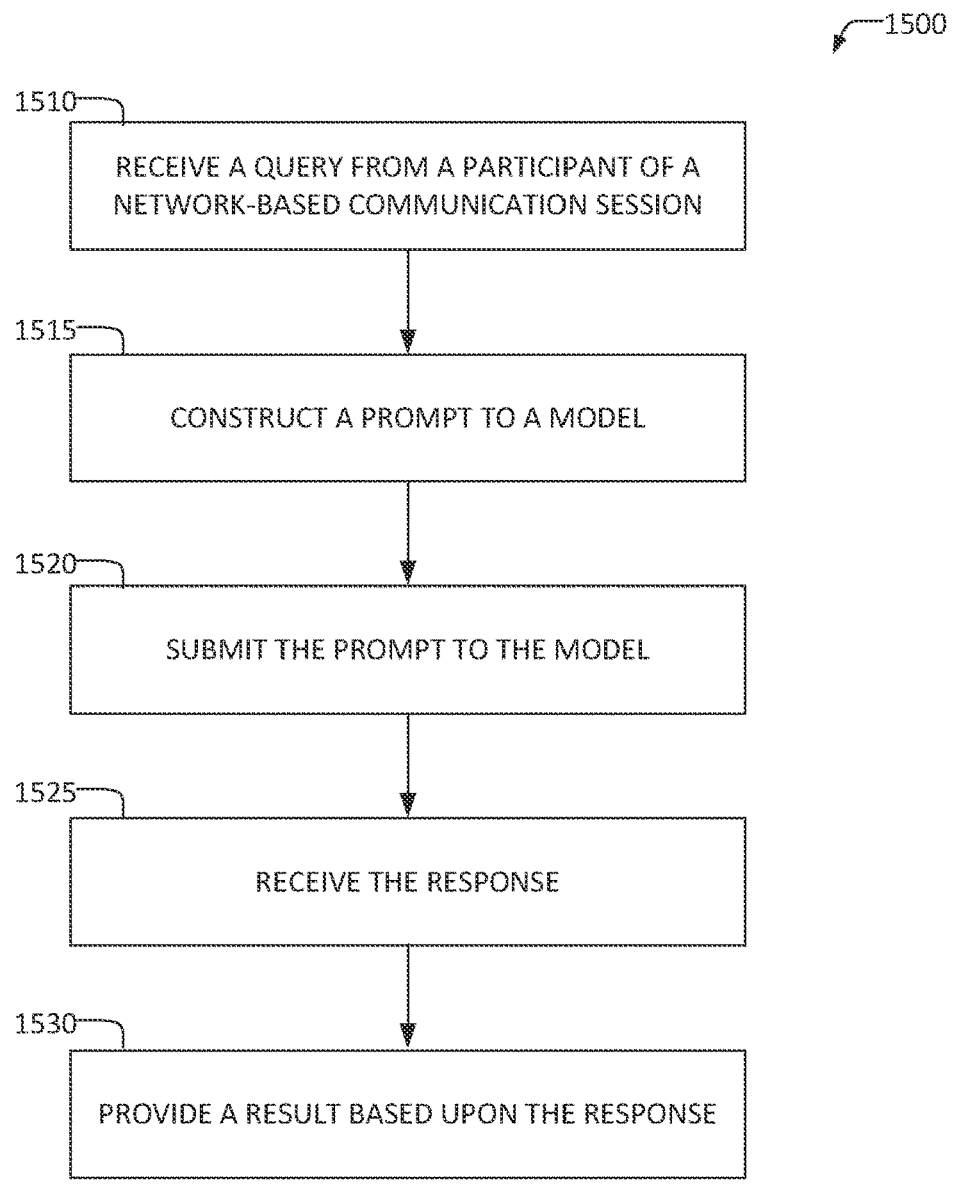
FIG. 15 illustrates a flowchart of a method for providing a personalized assistant (e.g., a copilot) within a network-based communication session.

FIG. 15 illustrates a flowchart of a method 1500 for providing a personalized assistant (e.g., a copilot) within a network-based communication session. At operation 1510, the copilot may receive a query from a participant of the network-based communication session. The query may be a free-text query, a suggested query, or the like. For example, if the participant is late to the communication session, the system may suggest that the participant "catch up" with what happened by getting a summary of the communication session to that point in time. In some examples, the query may be typed by the user into an entry box, but in other examples, the query may be entered by clicking or otherwise selecting a selectable element of a GUI such as a selectable suggested query. In some examples, the query may be received from a client communication application that sends it over a network to a communication service.

At operation 1515, the copilot may construct a prompt to a language model such as a machine-learned large language model. In some examples, the prompt includes a portion of content of the network-based communication session and instructions based upon the query. The portion of content may include one or more of: a summary of a transcript (e.g., previously created by the LLM), a file shared during the network-based communication session, a communication session agenda, a communication session title, information about participants of the network-based communication session, a conversation history between the personalized assistant and the participant, video shared during the network-based communication session, an email of the participant, or chat content. In some examples, the prompt may be constructed based upon one or more prompt templates that may be selected based upon the query and filled in with relevant communication session details. In some examples, the prompts may be constructed by a second model, such as a second machine-learned model. Example models may include a second large language model that may be of a same or different type than the large language model sent the prompt. In still other examples, the large language model may be asked to generate the prompt.

At operation 1520, the copilot may submit the prompt to the machine-learned large language model. In some examples, this may include calling the machine-learned large language model locally or may include sending the prompt using an API of the machine-learned large language model.

At operation 1525, the copilot may receive a response from the machine-learned large language model. As with operation 1520 this may be a locally received response or a response received over a network.

At operation 1530, the copilot may provide a result to the participant as part of a Graphical User Interface of the network-based communication session, the result based upon the response. In some examples, the result may be the response, but in other examples, additional prompts may be submitted to the machine-learned large language model and the additional responses may be used instead of, or additionally to the response to provide the result. For example, the copilot may have logic to determine a quality of the response. If the quality is below a threshold, a prompt with new language may be utilized and the response of that prompt may be utilized. In some examples, the query of the user may require additional prompts. That is, the query may require multiple prompts and responses and each prompt and response answers a portion of the user's query. For example, to create the pros and cons list, the copilot may first query the LLM for the ideas expressed. Then for each idea, the copilot may query the pros and cons discussed for each idea. In other examples, multiple prompts may be utilized to, for example, summarize the transcript of the communication session to allow for searching the query.

Figure 16:
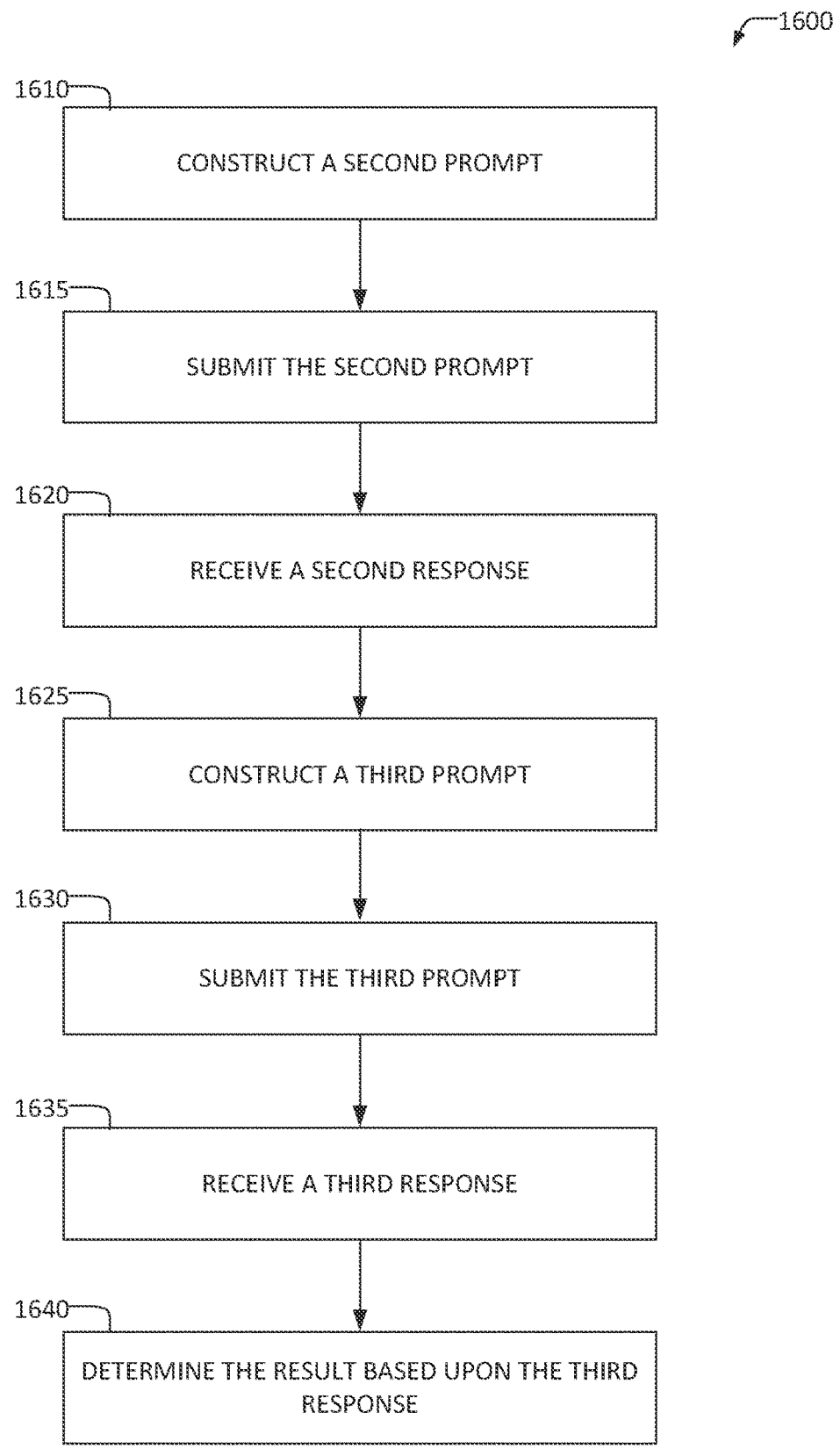
FIG. 16 illustrates a flowchart of a method for providing a personalized assistant (e.g., a copilot) within a network-based communication session by creating a summary of summaries according to some examples of the present disclosure.

FIG. 16 illustrates a flowchart of a method 1600 for providing a personalized assistant (e.g., a copilot) within a network-based communication session by creating a summary of summaries according to some examples of the present disclosure. Method 1600 may be utilized to create a summary of summaries submitted, e.g., as part of the prompt in operation 1515. In other examples, operations 1515-1525 may be a first portion of creating a summary of summaries wherein the prompt to the model requests the model to summarize a first portion of the live transcript of the network-based communication session. In these examples, the prompt at operation 1515 may request that the LLM summarize a first portion of the transcript and the response at operation 1525 is a first summary. The operations of FIG. 16 may be performed between operations 1525 and 1530 in these examples.

At operation 1610, the copilot may construct a second prompt to the machine-learned large language model, the second prompt including a second portion of the live transcript of the network-based communication session and second instructions to summarize the second portion of the live transcript. In some examples, the first and second portions of the transcript may be overlapping. Using overlapping transcripts may reduce incidents where the final summary produced by the summary of summaries approach fails to provide appropriate relevant context.

At operation 1615, the copilot may submit the second prompt to the machine-learned large language model. At operation 1620, the copilot may receive a second response from the machine-learned large language model, the second response being for the second prompt. As noted for FIG. 15, the prompts and responses may be sent and received locally or via a network.

At operation 1625, the system may construct a third prompt to the machine-learned large language model, the third prompt including the response and second response and third instructions to summarize the response and second response. At operation 1630, the copilot submits the third prompt to the machine-learned large language model. At operation 1635, the copilot receives a third response from the machine-learned large language model, the third response being a summary of the entire communication session up to the point the request for the summary was received. At operation 1640, the copilot determines the result based upon the third response. In some examples, the third response may be the result. In other examples, the system may utilize the third result in another prompt to the LLM—for example, issuing a query on the summary and the response to that prompt may be the result.

While FIG. 16 illustrated breaking the transcript into two portions, summarizing those portions, and then summarizing the summaries, in other examples, the copilot may break the transcript into more than two portions, summarize those portions, and then summarizing those summaries. In the operations of FIG. 16, two summary stages are utilized. A first to summarize a portion of the transcript and a second to summarize the summaries. In other examples, for very long communication sessions, additional stages may be used. For example, a first stage may summarize a large number of transcript portions. These summaries may be grouped together and then those groups summarized. The summaries of the groups may then be summarized and so on. Thus, more than two stages of summarization may be employed.

Figure 17:
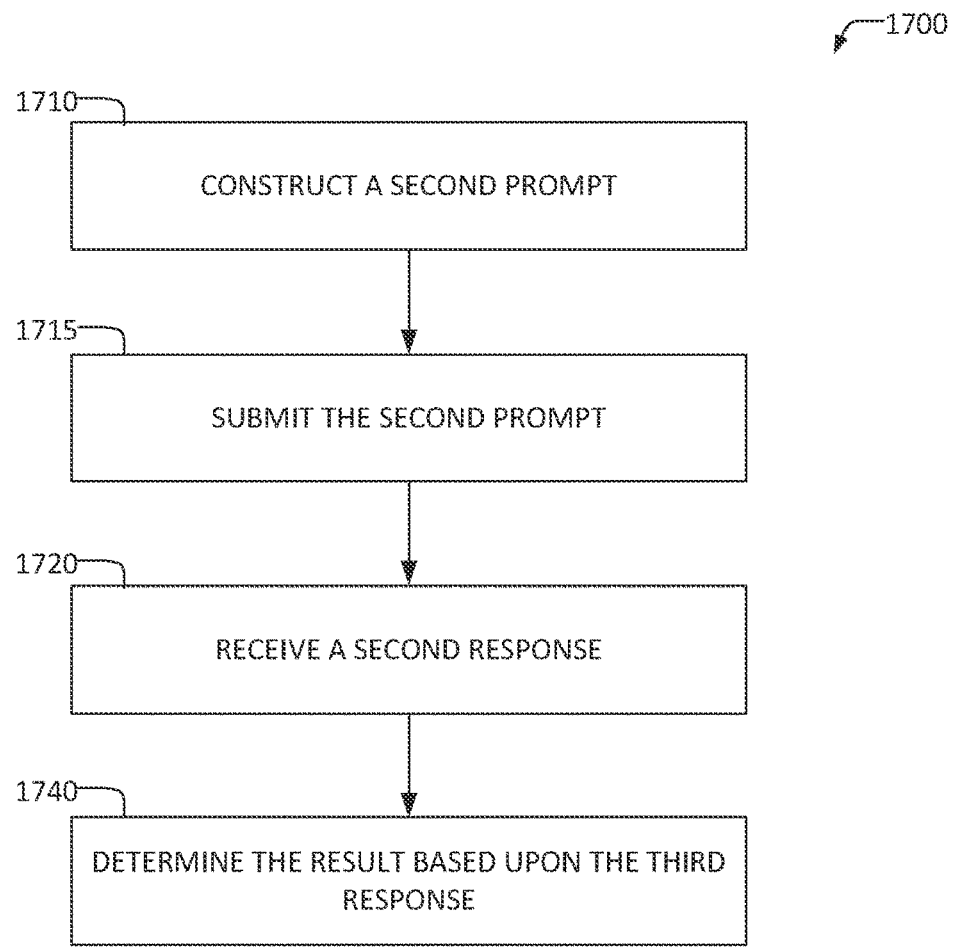
FIG. 17 illustrates a flowchart of a method for providing a personalized assistant (e.g., a copilot) within a network-based communication session by creating a rolling summary to some examples of the present disclosure.

FIG. 17 illustrates a flowchart of a method 1700 for providing a personalized assistant (e.g., a copilot) within a network-based communication session by creating a rolling summary according to some examples of the present disclosure. Method 1700 may be utilized to create a rolling summary submitted, e.g., as part of the prompt in operation 1515. In other examples, operations 1515-1525 may be a first portion of creating a rolling summary wherein the prompt to the model requests the model to summarize a first portion of the live transcript of the network-based communication session. In these examples, the prompt at operation 1515 may request that the LLM summarize a first portion of the transcript and the response at operation 1525 is a first summary. The operations of FIG. 17 may be performed between operations 1525 and 1530 in these examples.

At operation 1710, the copilot may construct a second prompt to the machine-learned large language model, the second prompt including a second portion of the live transcript of the network-based communication session, and the first summary (e.g., the response received at operation 1525) and second instructions to summarize both the second portion of the live transcript and the summarization. In some examples, the first and second portions of the transcript may be overlapping. Using overlapping transcripts may reduce incidents where the final summary produced by the summary of summaries approach fails to provide appropriate relevant context.

At operation 1715, the copilot may submit the second prompt to the machine-learned large language model. At operation 1720, the copilot may receive a second response from the machine-learned large language model, the second response being for the second prompt. As noted for FIG. 15, the prompts and responses may be sent and received locally or via a network.

At operation 1740, the copilot determines the result based upon the second response. In some examples, the second response may be the result. In other examples, the system may utilize the second result in another prompt to the LLM—for example, issuing a query on the summary and the response to that prompt may be the result. In these examples, the prompts to create the initial summaries may include the query and ask the LLM to summarize the transcript and include relevant information about the query. While FIG. 17 illustrates the use of two prompts and two live transcript portions, the transcript may be broken up into more than two portions and additional prompts may be utilized.

Figure 18:
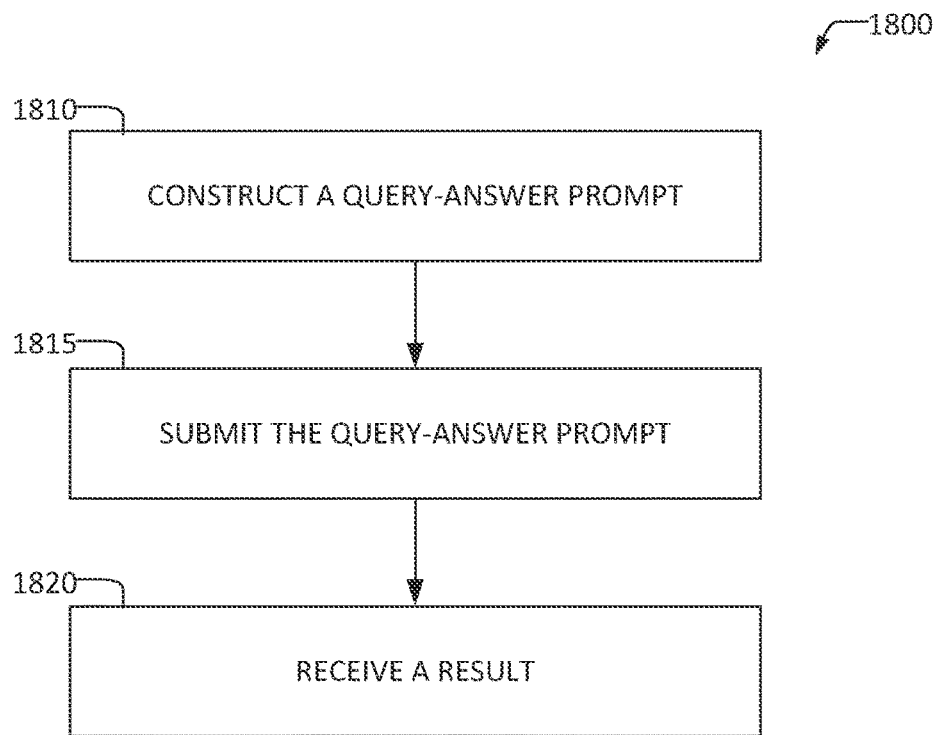
FIG. 18 illustrates a flowchart of a method of querying a transcript of a network-based communication session according to some examples of the present disclosure.

FIG. 18 illustrates a flowchart of a method 1800 of querying a transcript of a network-based communication session according to some examples of the present disclosure. The method 1800 may operate upon a transcript created using a summary of summaries or rolling summary method where the prompt includes the query and instructions to preserve details about the query. The method 1800 may operate as part of method 1500, such as after one or more of FIG. 16 or 17. At operation 1810, the copilot may construct a query-answer prompt that asks the LLM to answer the query using the summary. At operation 1815, the copilot may submit the query-answer prompt. As previously noted, this may be locally or remotely sent. At operation 1820, the copilot may receive the result. In some examples, the result may be used with operation 1530 of FIG. 15.

Figure 19:
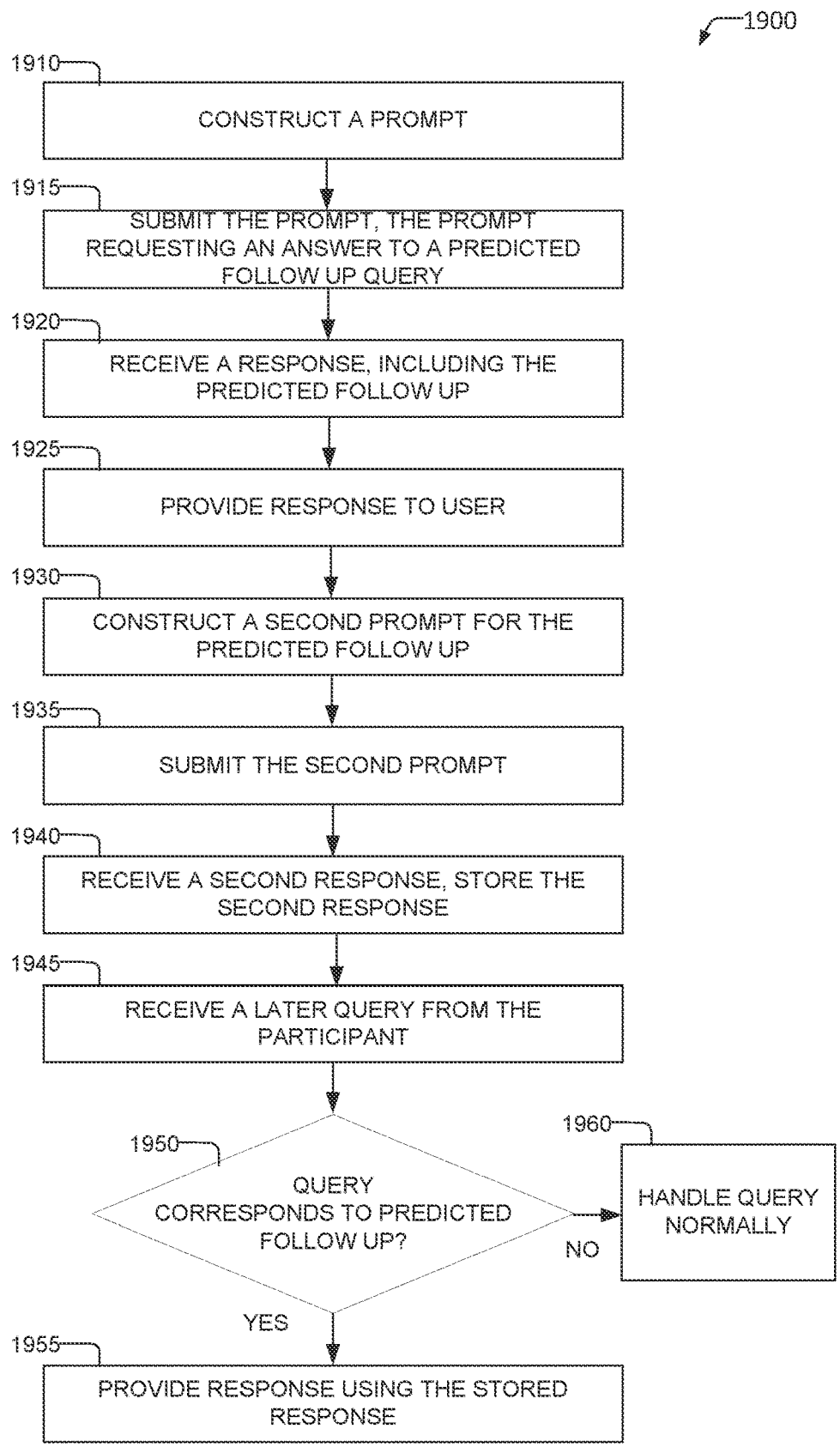
FIG. 19 illustrates a flowchart of a method for caching a predicted query response according to some examples of the present disclosure.

FIG. 19 illustrates a flowchart of a method 1900 for caching a predicted query response according to some examples of the present disclosure. At operation 1910, the system may construct a prompt, e.g., based upon a query, a summarization task, or the like. At operation 1915, the copilot may submit the prompt. The prompt may be created at operation 1910 and submitted at operation 1915 based upon a submitted user query, the prompt may also (in addition to requesting the answer to the query) include a request for the large language model to predict a follow up query and provide that with the response. At operation 1920, the response may be received including the predicted follow up. At operation 1925, the response may be provided to the user, e.g., by providing it in a GUI, such as a GUI of the network-based communication service. At operation 1930, the copilot may, without a prompt from the user asking the follow up query, construct a second prompt for the LLM to answer the follow up query and submit the prompt to the LLM at operation 1935. The response may be received and stored (e.g., in a volatile or non-volatile memory) at operation 1940. In some examples, the prompt constructed at operation 1910 may also request that the LLM answer the query in the first prompt and provide the response with the response received at operation 1920. For these examples, operations 1930, 1935, and 1940 may be skipped.

At operation 1945 a later query may be received from the participant. At operation 1950 it is determined if the query corresponds to a predicted follow up. In some examples, multiple follow up questions may be requested from the LLM and stored before the participant asks. If the query does not correspond to a predicted follow up query stored by the system, then at operation 1960, the system may handle the query normally. For example, by one or more of the method in FIGS. 15-18.

In some examples, similarity may be measured based upon an exact match between the query and the predicted follow up query. For example, the system may display the LLM's predicted follow up question to the user and ask the user if they would like the response. The user may indicate that they with to see the answer. In these examples, the query issued at operation 1945 is identical to the predicted follow up.

In other examples, various semantic similarity algorithms may be used to determine a similarity between the later query and the predicted follow up. For example, by using a latent semantic analysis and the like. If the submitted query and the predicted follow up are within a specified similarity, then they may be deemed to be corresponding at operation 1950. If the later query corresponds to the predicted follow up at operation 1950, then at operation 1955, the stored response may be proved to the user, e.g., in the GUI.

Figure 20:
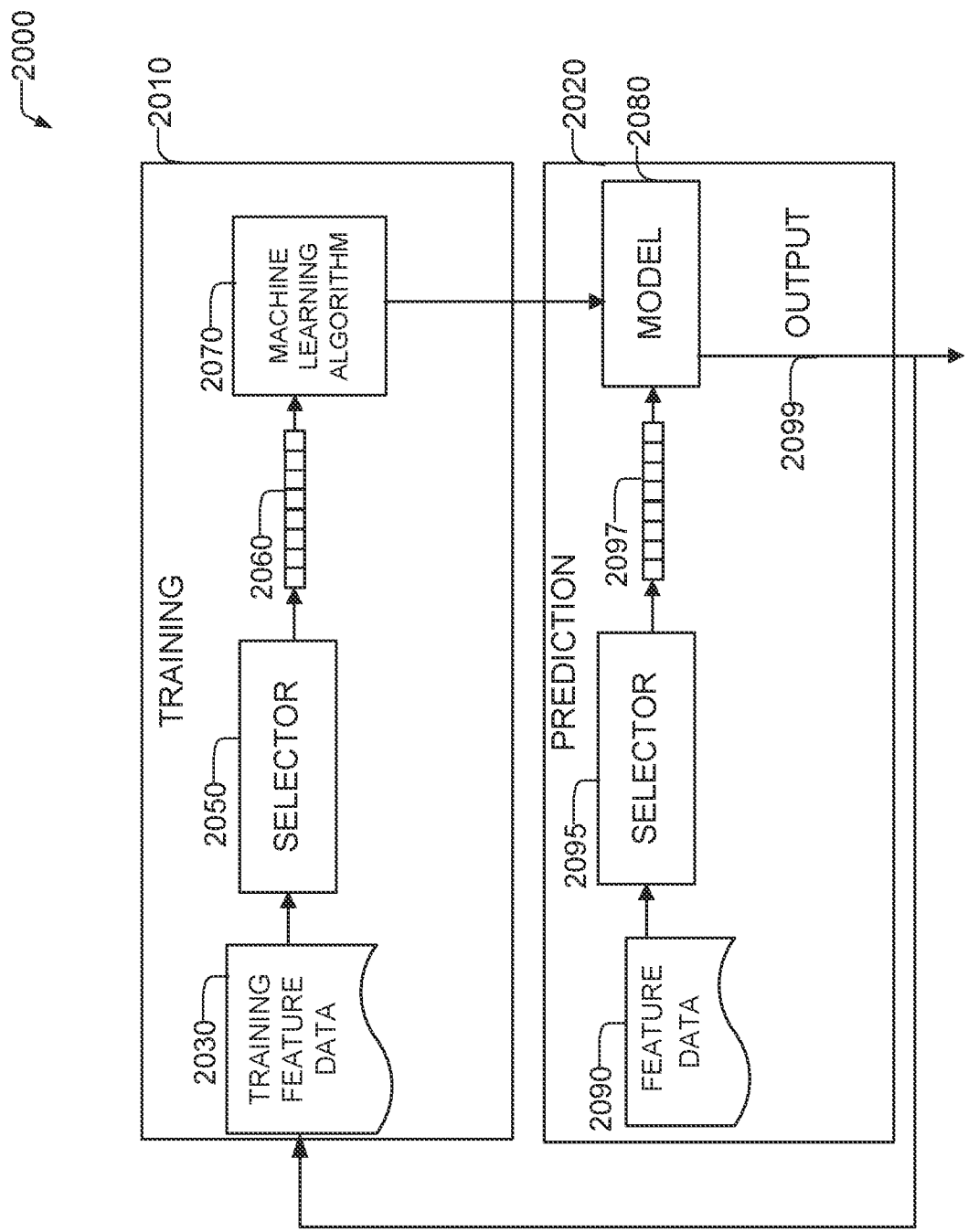
FIG. 20 shows an example machine learning module according to some examples of the present disclosure.

As previously noted, the copilot may utilize one or more machine-learning algorithms, for example, to answer questions about the communication session, produce prompts for other models, determine suggested questions, and the like. FIG. 20 shows an example machine learning module 2000 according to some examples of the present disclosure. The machine learning module 2000 may be implemented in whole or in part by one or more computing devices. In some examples, the training module 2010 may be implemented by a different device than the prediction module 2020. In these examples, the model 2080 may be created on a first machine and then sent to a second machine. In some examples, one or more portions of the machine learning module 2000 may be implemented by network-based communication servicer 1214 or network-based language model service 1216 of FIG. 12.

In some examples, machine learning module 2000 utilizes a training module 2010 and a prediction module 2020. Training module 2010 inputs training feature data 2030 into selector module 2050. The training feature data 2030 may include one or more sets of training data. The training feature data 2030 may be labeled with the desired output. In other examples, the training data may not be labeled, and the model may be trained using unsupervised methods and/or feedback data-such as through a reinforcement learning method. The feedback data may be a measure of error between a desired result of the algorithm and the actual result.

Selector module 2050 converts and/or selects training vector 2060 from the training feature data 2030. For example, the selector module 2050 may filter, select, transform, process, or otherwise convert the training data. For example, the selector module 2050 may apply one or more feature selection algorithms to find features in the training data. The selected data may fill training vector 2060 and comprises a set of the training data that is determined to be predictive of a result. Information chosen for inclusion in the training vector 2060 may be all the training feature data 2030 or in some examples, may be a subset of all the training feature data 2030. Selector module 2050 may also convert or otherwise process the training feature data 2030 such as normalization, encoding, and the like. The training vector 2060 may be utilized (along with any applicable labels) by the machine learning algorithm 2070 to produce a model 2080. In some examples, other data structures other than vectors may be used. The machine learning algorithm 2070 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected.

In the prediction module 2020, feature data 2090 is input to the selector module 2095. Selector module 2095 may operate the same, or differently than selector module 2050. In some examples, selector modules 2050 and 2095 are the same modules or different instances of the same module. Selector module 2095 produces vector 2097, which is input into the model 2080 to produce an output 2099. For example, the weightings and/or network structure learned by the training module 2010 may be executed on the vector 2097 by applying vector 2097 to a first layer of the model 2080 to produce inputs to a second layer of the model 2080, and so on until the encoding is output. As previously noted, other data structures may be used other than a vector (e.g., a matrix).

The training module 2010 may operate in an offline manner to train the model 2080. The prediction module 2020, however, may be designed to operate in an online manner. It should be noted that the model 2080 may be periodically updated via additional training and/or user feedback. For example, additional training feature data 2030 may be collected as users provide feedback on the performance of the predictions.

The machine learning algorithm 2070 may be selected from among many different potential supervised or unsupervised machine learning algorithms. Examples of learning algorithms include artificial neural networks, Generative Pretrained Transformer (GPT), convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, k-means, linear regression, logistic regression, a region based CNN, a full CNN (for semantic segmentation), a mask R-CNN algorithm for instance segmentation, Latent Dirichlet Algorithm (LDA), and hidden Markov models. Examples of unsupervised learning algorithms include expectation-maximization algorithms, vector quantization, and information bottleneck method.

While one training phase and a single model are shown, in other examples, multiple training phases may be used. For example, a supervised training phase may be used to initially train an initial model and an unsupervised phase may be used to finalize the model.

As noted, the machine-learning model may be used to answer questions about the communication session. The model 2080 in these examples may be a large language model (LLM) such as a GPT model. In these examples, a first learning phase may utilize training feature data 2030 that is demonstration data curated by human labelers. The model 2080 is a supervised policy (e.g., a Supervised Fine-Tuning (SFT) model) that generates outputs from feature data 2090 that comprises a selected list of prompts. Next, a large number of SFT model outputs are voted on by human labelers to create a new dataset comprising comparison data. This comparison data is then used as training feature data 2030 to create a new model 2080 called a reward model. The reward model is then used to further fine-tune the SFT model to output a policy model 2080. In some examples, the training process may utilize feature data specific to network-based communication sessions.

As additionally noted, a machine-learning model may be used to produce prompts for the LLM. In these examples, the training feature data 2030 may be queries labeled with the proper prompt and the output model 2080 may be a human language prompt for the LLM. The feature data 2090 may then be live queries issued by users and the output may be the proper prompt.

Finally, the machine-learning model may be used to determine suggested questions based upon the network-based communication session content and context. In these examples, the training feature data 2030 may be communication session transcripts, participant information, and other context labeled with suggested questions. The feature data 2090 may be actual content and context data and the output 2099 may be an identifier of a suggested question. In some examples, prior to displaying suggested questions, the system may generate one or more prompts for the suggested questions and issue them to the LLM to obtain and cache a response as shown in FIG. 19.

Figure 21:
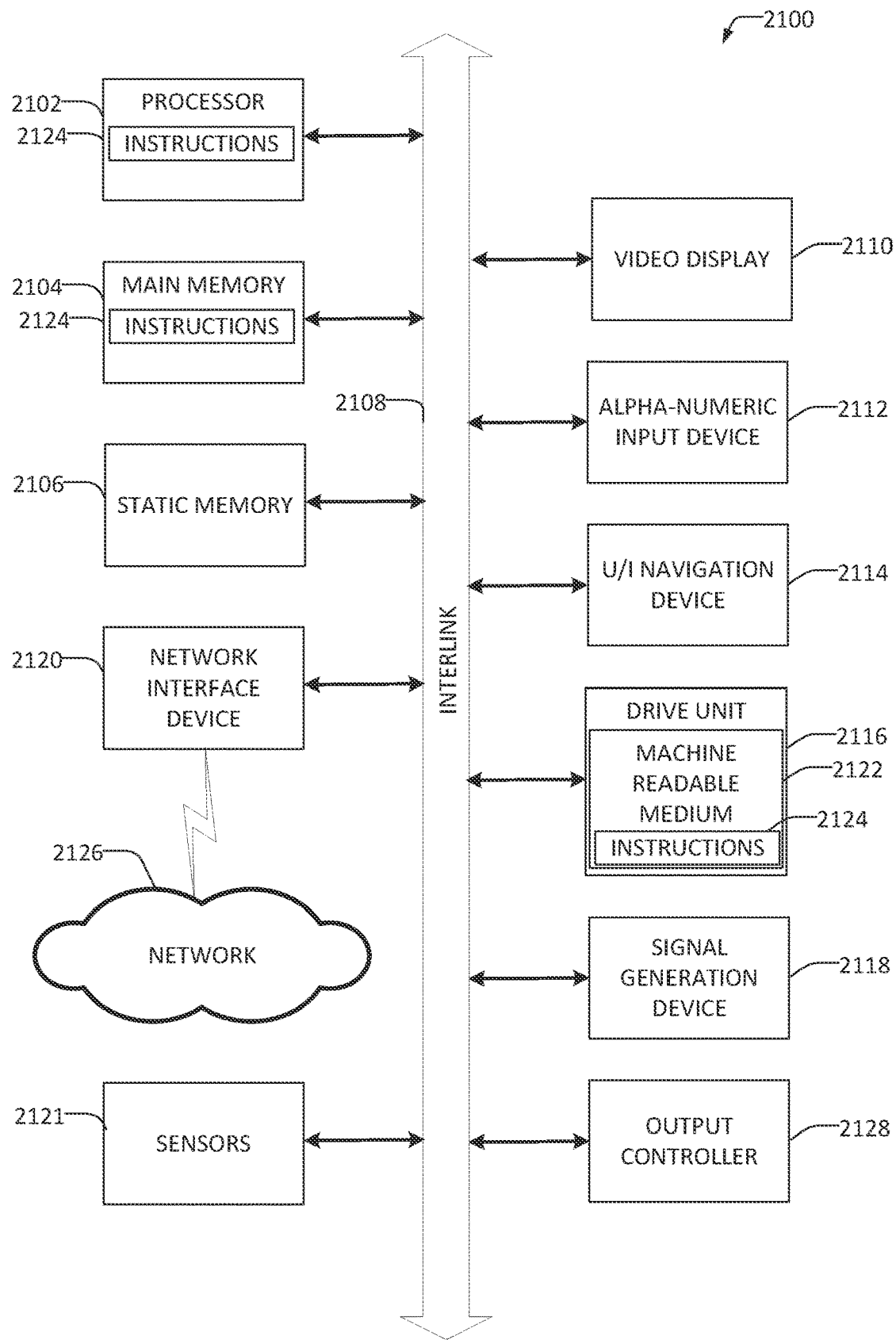
FIG. 21 is a block diagram illustrating an example of a machine upon which one or more embodiments may be implemented.

FIG. 21 illustrates a block diagram of an example machine 2100 upon which any one or more of the techniques (e.g., methodologies) discussed herein may be perfor, med. In alternative embodiments, the machine 2100 may operate as a standalone device or may be connected (e.g., networked) to other machines. In a networked deployment, the machine 2100 may operate in the capacity of a server machine, a client machine, or both in server-client network environments. In an example, the machine 2100 may act as a peer machine in peer-to-peer (P2P) (or other distributed) network environment. The machine 2100 may be in the form of a server computing system (e.g., that operates a service), a laptop, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

In some examples, machine 2100 may render, or create one or more of the GUIs of FIGS. 1-11 & 14; implement any of the computing devices of FIG. 12; implement the components of FIGS. 13 & 20; and implement the methods of FIGS. 15-19. In some examples, the machine 2100 may accomplish the rendering, creation, or implementation of the previous FIGS. by specific hardware configurations, software configuring general purpose hardware, or a combination of specific hardware and software.

Examples, as described herein, may include, or may operate on one or more logic units, components, or mechanisms ("components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 2100 may include one or more hardware processors, such as processor 2102. Processor 2102 may be a central processing unit (CPU), a graphics processing unit (GPU), a hardware processor core, or any combination thereof. Machine 2100 may include a main memory 2104 and a static memory 2106, some or all of which may communicate with each other via an interlink (e.g., bus) 2108. Examples of main memory 2104 may include Synchronous Dynamic Random-Access Memory (SDRAM), such as Double Data Rate memory, such as DDR4 or DDR5. Interlink 2108 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 2100 may further include a display unit 2110, an alphanumeric input device 2112 (e.g., a keyboard), and a user interface (UI) navigation device 2114 (e.g., a mouse). In an example, the display unit 2110, input device 2112 and UI navigation device 2114 may be a touch screen display. The machine 2100 may additionally include a storage device (e.g., drive unit) 2116, a signal generation device 2118 (e.g., a speaker), a network interface device 2120, and one or more sensors 2121, such as a global positioning system (GPS) sensor, compass, accelerometer, or other sensor. The machine 2100 may include an output controller 2128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 2116 may include a machine readable medium 2122 on which is stored one or more sets of data structures or instructions 2124 (e.g., software) embodying or utilized by any one or more of the techniques or functions described herein. The instructions 2124 may also reside, completely or at least partially, within the main memory 2104, within static memory 2106, or within the hardware processor 2102 during execution thereof by the machine 2100. In an example, one or any combination of the hardware processor 2102, the main memory 2104, the static memory 2106, or the storage device 2116 may constitute machine readable media.

While the machine readable medium 2122 is illustrated as a single medium, the term "machine readable medium" may include a single medium or multiple media (e.g., a centralized or distributed database, and/or associated caches and servers) configured to store the one or more instructions 2124.

The term "machine readable medium" may include any medium that is capable of storing, encoding, or carrying instructions for execution by the machine 2100 and that cause the machine 2100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 2124 may further be transmitted or received over a communications network 2126 using a transmission medium via the network interface device 2120. The Machine 2100 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 2120 may include one or more physical jacks (e.g., Ethernet, coaxial, or phone jacks) or one or more antennas to connect to the communications network 2126. In an example, the network interface device 2120 may include a plurality of antennas to wirelessly communicate using at least one of single-input multiple-output (SIMO), multiple-input multiple-output (MIMO), or multiple-input single-output (MISO) techniques. In some examples, the network interface device 2120 may wirelessly communicate using Multiple User MIMO techniques.

EXAMPLES

Example 1 is a system for providing a personalized assistant within a network-based communication service, the system comprising: one or more processors; and a memory storage device storing instructions thereon, which, when executed by the one or more processors, cause the system to perform operations comprising: during a network-based communication session, receiving a query from a computing device of a first communication session participant; processing the query by: determining that a second communication session participant has shared content via a content sharing feature of the network-based communication service; in response to the determining, providing the query and at least a portion of the shared content as input to a model, wherein the model processes the query and the portion of shared content to dynamically construct a prompt for use as input with a generative language model; providing the prompt as input to the generative language model; receiving, as output from the generative language model, a response; and causing presentation of the response to be presented to the communication session participant.

In Example 2, the subject matter of Example 1 includes, wherein the model comprises a rules-based engine that is configured to dynamically construct the prompt with a first instruction when the content shared via the content sharing feature of the network-based communication service satisfies a first rule-based condition, and to dynamically construct the prompt with a second instruction when the content shared via the content sharing feature of the network-based communication service does not satisfy the first rule-based condition.

In Example 3, the subject matter of Examples 1-2 includes, wherein the model comprises a rules-based engine that is configured to dynamically construct the prompt by selecting, with a first selection criteria, a first portion of content from a meeting transcript to include as context in the prompt, when the content shared via the content sharing feature of the network-based communication service satisfies a first rule-based condition, and to dynamically construct the prompt by selecting, with a second selection criteria, a second portion of content from the meeting transcript to include as context in the prompt, when the content shared via the content sharing feature of the network-based communication service does not satisfy the first rule-based condition.

In Example 4, the subject matter of Examples 1-3 includes, wherein the prompt comprises a first portion, representing context, and a second portion, representing an instruction, and dynamically constructing the prompt further comprises: constructing the prompt to include, as context, a portion of the content shared via the content sharing feature of the network-based communication service, by: processing a prompt template for the prompt, the prompt template comprising a content selection criteria; selecting, using the content selection criteria of the prompt template, the portion of the content shared via the content sharing feature of the network-based communication service, to include as context in the prompt.

In Example 5, the subject matter of Examples 1-4 includes, wherein the prompt comprises a first portion, representing context, and a second portion, representing an instruction, and dynamically constructing the prompt further comprises: constructing the prompt to include, as a part of the instruction, a portion of the content shared via the content sharing feature of the network-based communication service, by: processing a prompt template for the prompt, the prompt template comprising a content selection criteria; selecting, using the content selection criteria of the prompt template, the portion of the content shared via the content sharing feature of the network-based communication service, to include as part of the instruction in the prompt.

In Example 6, the subject matter of Examples 1-5 includes, wherein the prompt comprises a first portion, representing context, and a second portion, representing an instruction, and dynamically constructing the prompt further comprises: constructing the prompt to include a portion of the content shared via the content sharing feature of the network-based communication service, as context; and selecting a first instruction from a plurality of instructions, based on a result of an evaluation of the content shared via the content sharing feature of the network-based communication service.

In Example 7, the subject matter of Examples 1-6 includes, wherein the query is a free-text query specified by the first communication session participant, and dynamically constructing the prompt further comprises: using the content shared via the content sharing feature of the network-based communication service and the free-text query as input to the model, the model comprising a machine learning model that has been trained to generate the prompt using as input to the machine learning model the content and the free-text query.

Example 8 is a method for providing a personalized assistant within a network-based communication service, the method comprising: during a network-based communication session, receiving a query from a computing device of a first communication session participant; processing the query by: determining that a second communication session participant has shared content via a content sharing feature of the network-based communication service; in response to the determining, providing the query and at least a portion of the shared content as input to a model, wherein the model processes the query and the portion of shared content to dynamically construct a prompt for use as input with a generative language model; providing the prompt as input to the generative language model; receiving, as output from the generative language model, a response; and causing presentation of the response to be presented to the communication session participant.

In Example 9, the subject matter of Example 8 includes, wherein the model comprises a rules-based engine that is configured to dynamically construct the prompt with a first instruction when the content shared via the content sharing feature of the network-based communication service satisfies a first rule-based condition, and to dynamically construct the prompt with a second instruction when the content shared via the content sharing feature of the network-based communication service does not satisfy the first rule-based condition.

In Example 10, the subject matter of Examples 8-9 includes, wherein the model comprises a rules-based engine that is configured to dynamically construct the prompt by selecting, with a first selection criteria, a first portion of content from a meeting transcript to include as context in the prompt, when the content shared via the content sharing feature of the network-based communication service satisfies a first rule-based condition, and to dynamically construct the prompt by selecting, with a second selection criteria, a second portion of content from the meeting transcript to include as context in the prompt, when the content shared via the content sharing feature of the network-based communication service does not satisfy the first rule-based condition.

In Example 11, the subject matter of Examples 8-10 includes, wherein the prompt comprises a first portion, representing context, and a second portion, representing an instruction, and dynamically constructing the prompt further comprises: constructing the prompt to include, as context, a portion of the content shared via the content sharing feature of the network-based communication service, by: processing a prompt template for the prompt, the prompt template comprising a content selection criteria; selecting, using the content selection criteria of the prompt template, the portion of the content shared via the content sharing feature of the network-based communication service, to include as context in the prompt.

In Example 12, the subject matter of Examples 8-11 includes, wherein the prompt comprises a first portion, representing context, and a second portion, representing an instruction, and dynamically constructing the prompt further comprises: constructing the prompt to include, as a part of the instruction, a portion of the content shared via the content sharing feature of the network-based communication service, by: processing a prompt template for the prompt, the prompt template comprising a content selection criteria; selecting, using the content selection criteria of the prompt template, the portion of the content shared via the content sharing feature of the network-based communication service, to include as part of the instruction in the prompt.

In Example 13, the subject matter of Examples 8-12 includes, wherein the prompt comprises a first portion, representing context, and a second portion, representing an instruction, and dynamically constructing the prompt further comprises: constructing the prompt to include a portion of the content shared via the content sharing feature of the network-based communication service, as context; and selecting a first instruction from a plurality of instructions, based on a result of an evaluation of the content shared via the content sharing feature of the network-based communication service.

In Example 14, the subject matter of Examples 8-13 includes, wherein the query is a free-text query specified by the first communication session participant, and dynamically constructing the prompt further comprises: using the content shared via the content sharing feature of the network-based communication service and the free-text query as input to the model, the model comprising a machine learning model that has been trained to generate the prompt using as input to the machine learning model the content and the free-text query.

Example 15 is a system for providing a personalized assistant within a network-based communication service, the system comprising: during a network-based communication session, means for receiving a query from a computing device of a first communication session participant; means for processing the query by: determining that a second communication session participant has shared content via a content sharing feature of the network-based communication service; in response to the determining, providing the query and at least a portion of the shared content as input to a model, wherein the model processes the query and the portion of shared content to dynamically construct a prompt for use as input with a generative language model; providing the prompt as input to the generative language model; receiving, as output from the generative language model, a response; and causing presentation of the response to be presented to the communication session participant.

In Example 16, the subject matter of Example 15 includes, wherein the model comprises a rules-based engine that is configured to dynamically construct the prompt with a first instruction when the content shared via the content sharing feature of the network-based communication service satisfies a first rule-based condition, and to dynamically construct the prompt with a second instruction when the content shared via the content sharing feature of the network-based communication service does not satisfy the first rule-based condition.

In Example 17, the subject matter of Examples 15-16 includes, wherein the model comprises a rules-based engine that is configured to dynamically construct the prompt by selecting, with a first selection criteria, a first portion of content from a meeting transcript to include as context in the prompt, when the content shared via the content sharing feature of the network-based communication service satisfies a first rule-based condition, and to dynamically construct the prompt by selecting, with a second selection criteria, a second portion of content from the meeting transcript to include as context in the prompt, when the content shared via the content sharing feature of the network-based communication service does not satisfy the first rule-based condition.

In Example 18, the subject matter of Examples 15-17 includes, wherein the prompt comprises a first portion, representing context, and a second portion, representing an instruction, and dynamically constructing the prompt further comprises: means for constructing the prompt to include, as context, a portion of the content shared via the content sharing feature of the network-based communication service, by: means for processing a prompt template for the prompt, the prompt template comprising a content selection criteria; means for selecting, using the content selection criteria of the prompt template, the portion of the content shared via the content sharing feature of the network-based communication service, to include as context in the prompt.

In Example 19, the subject matter of Examples 15-18 includes, wherein the prompt comprises a first portion, representing context, and a second portion, representing an instruction, and dynamically constructing the prompt further comprises: means for constructing the prompt to include, as a part of the instruction, a portion of the content shared via the content sharing feature of the network-based communication service, by: means for processing a prompt template for the prompt, the prompt template comprising a content selection criteria; means for selecting, using the content selection criteria of the prompt template, the portion of the content shared via the content sharing feature of the network-based communication service, to include as part of the instruction in the prompt.

In Example 20, the subject matter of Examples 15-19 includes, wherein the prompt comprises a first portion, representing context, and a second portion, representing an instruction, and dynamically constructing the prompt further comprises: means for constructing the prompt to include a portion of the content shared via the content sharing feature of the network-based communication service, as context; and means for selecting a first instruction from a plurality of instructions, based on a result of an evaluation of the content shared via the content sharing feature of the network-based communication service.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A system for providing a personalized assistant within a network-based communication service, the system comprising:
   one or more processors; and
   a memory storage device storing instructions thereon, which, when executed by the one or more processors, cause the system to perform operations comprising:
      during a network-based communication session, receiving a query from a computing device of a first communication session participant;
      processing the query by:
         determining that a second communication session participant has shared content via a content sharing feature of the network-based communication service;
         in response to the determining, providing the query and at least a portion of the shared content as input to a model, wherein the model processes the query and the portion of shared content to dynamically construct a prompt for use as input with a generative language model;
         providing the prompt as input to the generative language model;
         receiving, as output from the generative language model, a response; and
         causing presentation of the response to be presented to the communication session participant.

2. The system of claim 1, wherein the model comprises a rules-based engine that is configured to dynamically construct the prompt with a first instruction when the content shared via the content sharing feature of the network-based communication service satisfies a first rule-based condition, and to dynamically construct the prompt with a second instruction when the content shared via the content sharing feature of the network-based communication service does not satisfy the first rule-based condition.

3. The system of claim 1, wherein the model comprises a rules-based engine that is configured to dynamically construct the prompt by selecting, with a first selection criteria, a first portion of content from a meeting transcript to include as context in the prompt, when the content shared via the content sharing feature of the network-based communication service satisfies a first rule-based condition, and to dynamically construct the prompt by selecting, with a second selection criteria, a second portion of content from the meeting transcript to include as context in the prompt, when the content shared via the content sharing feature of the network-based communication service does not satisfy the first rule-based condition.

4. The system of claim 1, wherein the prompt comprises a first portion, representing context, and a second portion, representing an instruction, and dynamically constructing the prompt further comprises:
   constructing the prompt to include, as context, a portion of the content shared via the content sharing feature of the network-based communication service, by:
   processing a prompt template for the prompt, the prompt template comprising a content selection criteria;
   selecting, using the content selection criteria of the prompt template, the portion of the content shared via the content sharing feature of the network-based communication service, to include as context in the prompt.

5. The system of claim 1, wherein the prompt comprises a first portion, representing context, and a second portion, representing an instruction, and dynamically constructing the prompt further comprises:
   constructing the prompt to include, as a part of the instruction, a portion of the content shared via the content sharing feature of the network-based communication service, by:
   processing a prompt template for the prompt, the prompt template comprising a content selection criteria;
   selecting, using the content selection criteria of the prompt template, the portion of the content shared via the content sharing feature of the network-based communication service, to include as part of the instruction in the prompt.

6. The system of claim 1, wherein the prompt comprises a first portion, representing context, and a second portion, representing an instruction, and dynamically constructing the prompt further comprises:
   constructing the prompt to include a portion of the content shared via the content sharing feature of the network-based communication service, as context; and
   selecting a first instruction from a plurality of instructions, based on a result of an evaluation of the content shared via the content sharing feature of the network-based communication service.

7. The system of claim 1, wherein the query is a free-text query specified by the first communication session participant, and dynamically constructing the prompt further comprises:
   using the content shared via the content sharing feature of the network-based communication service and the free-text query as input to the model, the model comprising a machine learning model that has been trained to generate the prompt using as input to the machine learning model the content and the free-text query.

8. A method for providing a personalized assistant within a network-based communication service, the method comprising:
   during a network-based communication session, receiving a query from a computing device of a first communication session participant;
   processing the query by:
      determining that a second communication session participant has shared content via a content sharing feature of the network-based communication service;
      in response to the determining, providing the query and at least a portion of the shared content as input to a model, wherein the model processes the query and the portion of shared content to dynamically construct a prompt for use as input with a generative language model;
      providing the prompt as input to the generative language model;
      receiving, as output from the generative language model, a response; and
      causing presentation of the response to be presented to the communication session participant.

9. The method of claim 8, wherein the model comprises a rules-based engine that is configured to dynamically construct the prompt with a first instruction when the content shared via the content sharing feature of the network-based communication service satisfies a first rule-based condition, and to dynamically construct the prompt with a second instruction when the content shared via the content sharing feature of the network-based communication service does not satisfy the first rule-based condition.

10. The method of claim 8, wherein the model comprises a rules-based engine that is configured to dynamically construct the prompt by selecting, with a first selection criteria, a first portion of content from a meeting transcript to include as context in the prompt, when the content shared via the content sharing feature of the network-based communication service satisfies a first rule-based condition, and to dynamically construct the prompt by selecting, with a second selection criteria, a second portion of content from the meeting transcript to include as context in the prompt, when the content shared via the content sharing feature of the network-based communication service does not satisfy the first rule-based condition.

11. The method of claim 8, wherein the prompt comprises a first portion, representing context, and a second portion, representing an instruction, and dynamically constructing the prompt further comprises:
   constructing the prompt to include, as context, a portion of the content shared via the content sharing feature of the network-based communication service, by:
   processing a prompt template for the prompt, the prompt template comprising a content selection criteria;
   selecting, using the content selection criteria of the prompt template, the portion of the content shared via the content sharing feature of the network-based communication service, to include as context in the prompt.

12. The method of claim 8, wherein the prompt comprises a first portion, representing context, and a second portion, representing an instruction, and dynamically constructing the prompt further comprises:
   constructing the prompt to include, as a part of the instruction, a portion of the content shared via the content sharing feature of the network-based communication service, by:
   processing a prompt template for the prompt, the prompt template comprising a content selection criteria;
   selecting, using the content selection criteria of the prompt template, the portion of the content shared via the content sharing feature of the network-based communication service, to include as part of the instruction in the prompt.

13. The method of claim 8, wherein the prompt comprises a first portion, representing context, and a second portion, representing an instruction, and dynamically constructing the prompt further comprises:
   constructing the prompt to include a portion of the content shared via the content sharing feature of the network-based communication service, as context; and
   selecting a first instruction from a plurality of instructions, based on a result of an evaluation of the content shared via the content sharing feature of the network-based communication service.

14. The method of claim 8, wherein the query is a free-text query specified by the first communication session participant, and dynamically constructing the prompt further comprises:
   using the content shared via the content sharing feature of the network-based communication service and the free-text query as input to the model, the model comprising a machine learning model that has been trained to generate the prompt using as input to the machine learning model the content and the free-text query.

15. A system for providing a personalized assistant within a network-based communication service, the system comprising:
   during a network-based communication session, means for receiving a query from a computing device of a first communication session participant;
   means for processing the query by:
      determining that a second communication session participant has shared content via a content sharing feature of the network-based communication service;
      in response to the determining, providing the query and at least a portion of the shared content as input to a model, wherein the model processes the query and the portion of shared content to dynamically construct a prompt for use as input with a generative language model;
      providing the prompt as input to the generative language model;
      receiving, as output from the generative language model, a response; and
      causing presentation of the response to be presented to the communication session participant.

16. The system of claim 15, wherein the model comprises a rules-based engine that is configured to dynamically construct the prompt with a first instruction when the content shared via the content sharing feature of the network-based communication service satisfies a first rule-based condition, and to dynamically construct the prompt with a second instruction when the content shared via the content sharing feature of the network-based communication service does not satisfy the first rule-based condition.

17. The system of claim 15, wherein the model comprises a rules-based engine that is configured to dynamically construct the prompt by selecting, with a first selection criteria, a first portion of content from a meeting transcript to include as context in the prompt, when the content shared via the content sharing feature of the network-based communication service satisfies a first rule-based condition, and to dynamically construct the prompt by selecting, with a second selection criteria, a second portion of content from the meeting transcript to include as context in the prompt, when the content shared via the content sharing feature of the network-based communication service does not satisfy the first rule-based condition.

18. The system of claim 15, wherein the prompt comprises a first portion, representing context, and a second portion, representing an instruction, and dynamically constructing the prompt further comprises:
   means for constructing the prompt to include, as context, a portion of the content shared via the content sharing feature of the network-based communication service, by:
   means for processing a prompt template for the prompt, the prompt template comprising a content selection criteria;
   means for selecting, using the content selection criteria of the prompt template, the portion of the content shared via the content sharing feature of the network-based communication service, to include as context in the prompt.

19. The system of claim 15, wherein the prompt comprises a first portion, representing context, and a second portion, representing an instruction, and dynamically constructing the prompt further comprises:
   means for constructing the prompt to include, as a part of the instruction, a portion of the content shared via the content sharing feature of the network-based communication service, by:

means for processing a prompt template for the prompt, the prompt template comprising a content selection criteria;

means for selecting, using the content selection criteria of the prompt template, the portion of the content shared via the content sharing feature of the network-based communication service, to include as part of the instruction in the prompt.

20. The system of claim 15, wherein the prompt comprises a first portion, representing context, and a second portion, representing an instruction, and dynamically constructing the prompt further comprises:

means for constructing the prompt to include a portion of the content shared via the content sharing feature of the network-based communication service, as context; and means for selecting a first instruction from a plurality of instructions, based on a result of an evaluation of the content shared via the content sharing feature of the network-based communication service.

* * * * *